(12) United States Patent
Kerfoot, Jr. et al.

(10) Patent No.: US 8,994,331 B2
(45) Date of Patent: Mar. 31, 2015

(54) METHOD AND APPARATUS FOR ADAPTING A BATTERY VOLTAGE

(75) Inventors: Roy L. Kerfoot, Jr., Lilburn, GA (US); John E. Herrmann, Suwanee, GA (US)

(73) Assignee: Motorola Solutions, Inc., Schaumburg, IL (US)

( * ) Notice: Subject to any disclaimer, the term of this patent is extended or adjusted under 35 U.S.C. 154(b) by 386 days.

(21) Appl. No.: 13/485,333

(22) Filed: May 31, 2012

(65) Prior Publication Data

US 2013/0320926 A1   Dec. 5, 2013

(51) Int. Cl.
*H02J 7/00* (2006.01)
*H01M 10/44* (2006.01)

(52) U.S. Cl.
CPC ............. *H02J 7/0024* (2013.01); *H01M 10/44* (2013.01)
USPC ............................ 320/117; 320/107; 320/109

(58) Field of Classification Search
CPC .... B60L 11/1855; H02J 7/0024; H01M 10/44
USPC .......................................... 320/107, 109, 117
See application file for complete search history.

(56) References Cited

U.S. PATENT DOCUMENTS

| | | | |
|---|---|---|---|
| 3,387,194 A | 6/1968 | Banks | |
| 5,121,046 A | 6/1992 | McCullough | |
| 5,489,486 A | 2/1996 | Glover | |
| 5,565,756 A * | 10/1996 | Urbish et al. | 320/103 |
| 5,912,544 A * | 6/1999 | Miyakawa et al. | 320/106 |
| 6,430,692 B1 | 8/2002 | Kimble | |
| 6,873,133 B1 | 3/2005 | Kavounas | |
| 7,038,463 B2 | 5/2006 | Cooper et al. | |
| 7,772,799 B2 | 8/2010 | Wu | |
| 7,783,357 B2 | 8/2010 | Brink et al. | |
| 7,898,223 B2 | 3/2011 | Takeda et al. | |
| 2001/0012794 A1 | 8/2001 | Nishihara et al. | |
| 2003/0214269 A1 | 11/2003 | Shiue et al. | |
| 2006/0133007 A1 | 6/2006 | Shiue et al. | |
| 2008/0007215 A1 | 1/2008 | Hsieh | |

(Continued)

FOREIGN PATENT DOCUMENTS

| | | |
|---|---|---|
| DE | 10132221 A1 | 1/2003 |
| DE | 102007027902 A1 | 12/2008 |

(Continued)

OTHER PUBLICATIONS

Linden, D.—Reconfigurable Battery System for Power Management in Mobile Applications—Handbook of Batteries—McGraw-Hill, New York—1995—4 pages.

(Continued)

*Primary Examiner* — Sun Lin
(74) *Attorney, Agent, or Firm* — Barbara R. Doutre

(57) ABSTRACT

An apparatus and method for adapting a voltage of a battery pack is provided through a switch control logic coupled to the cells of the pack. The switch control logic determines the output voltage generated by the cells and an operating state of the battery pack. The switch control logic is configured to selectively switch the plurality of cells between a series cell configuration and a parallel cell configuration based upon the determined current output voltage and the operating state of the battery pack.

20 Claims, 17 Drawing Sheets

(56) References Cited

U.S. PATENT DOCUMENTS

| | | |
|---|---|---|
| 2008/0180061 A1 | 7/2008 | Koski et al. |
| 2009/0058367 A1 | 3/2009 | Naik |
| 2009/0079384 A1 | 3/2009 | Harris |
| 2009/0085523 A1 | 4/2009 | Kim |
| 2009/0085553 A1 | 4/2009 | Kumar et al. |
| 2009/0128158 A1 | 5/2009 | Kawai |
| 2009/0286149 A1 | 11/2009 | Ci et al. |
| 2011/0001456 A1 | 1/2011 | Wang |
| 2011/0140526 A1 | 6/2011 | Weidenheimer et al. |

FOREIGN PATENT DOCUMENTS

| | | |
|---|---|---|
| DE | 102010020473 A1 | 11/2010 |
| DE | 102010014104 A1 | 10/2011 |

OTHER PUBLICATIONS

International Search Report for International Patent Application No. PCT/US2013/039648 mailed Jul. 23, 2013.

\* cited by examiner

METHOD AND APPARATUS FOR ADAPTING A BATTERY VOLTAGE

FIELD OF THE DISCLOSURE

The present disclosure relates generally to the operation of rechargeable batteries wherein the voltage range of the cells embedded in the rechargeable batteries are lower and/or higher than the compatible range of the host device and/or charger device.

BACKGROUND

Communication devices, particularly portable communication devices such as handheld two-way radios, are typically powered by rechargeable battery packs containing a plurality of battery cells. These battery packs or cells may be coupled internally or externally to the portable product which operates as a host device. With the advances in technology, usable cell voltage ranges are extending beyond the operational input voltage ranges of communication products. Factors such as cell size, weight, battery capacity, voltage range, battery cut-off voltage, and battery load current are all important considerations in the design and development of portable products as well as in the design of charger devices needed to support the charging of the batteries.

As newer cell technologies become available, it is desirable to incorporate new battery cells into future and existing (legacy) product lines. However, legacy host devices operating on a limited voltage range, for example, at a voltage range between 5.6-8.4V, are unable to fully utilize the capacity provided by newer rechargeable battery cells, such as lithium-ion cells for which the useful voltage can be extended as high as 4.5V or as low as 2.0V per cell. This is due to the fact that most host devices will perform a low-voltage shutdown at a particular threshold voltage (for example, at a voltage less than 5.7V) prior to fully discharging the newer technology battery cells. Also, the host devices are designed for a particular maximum input voltage (e.g., 8.4 V) and may not efficiently utilize higher voltages afforded by newer-technology cells (e.g., 9.0 V when two 4.5V cells are used in series). Another problem with the use of newer cells is the need to reduce battery load current when the battery is at a low state of charge thereby minimizing voltage losses due to series resistance in the battery or host device.

Accordingly, there is a need for a means to adapt the newer battery cells/packs for host device and charger operation over narrower low voltage ranges.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Figure 1:
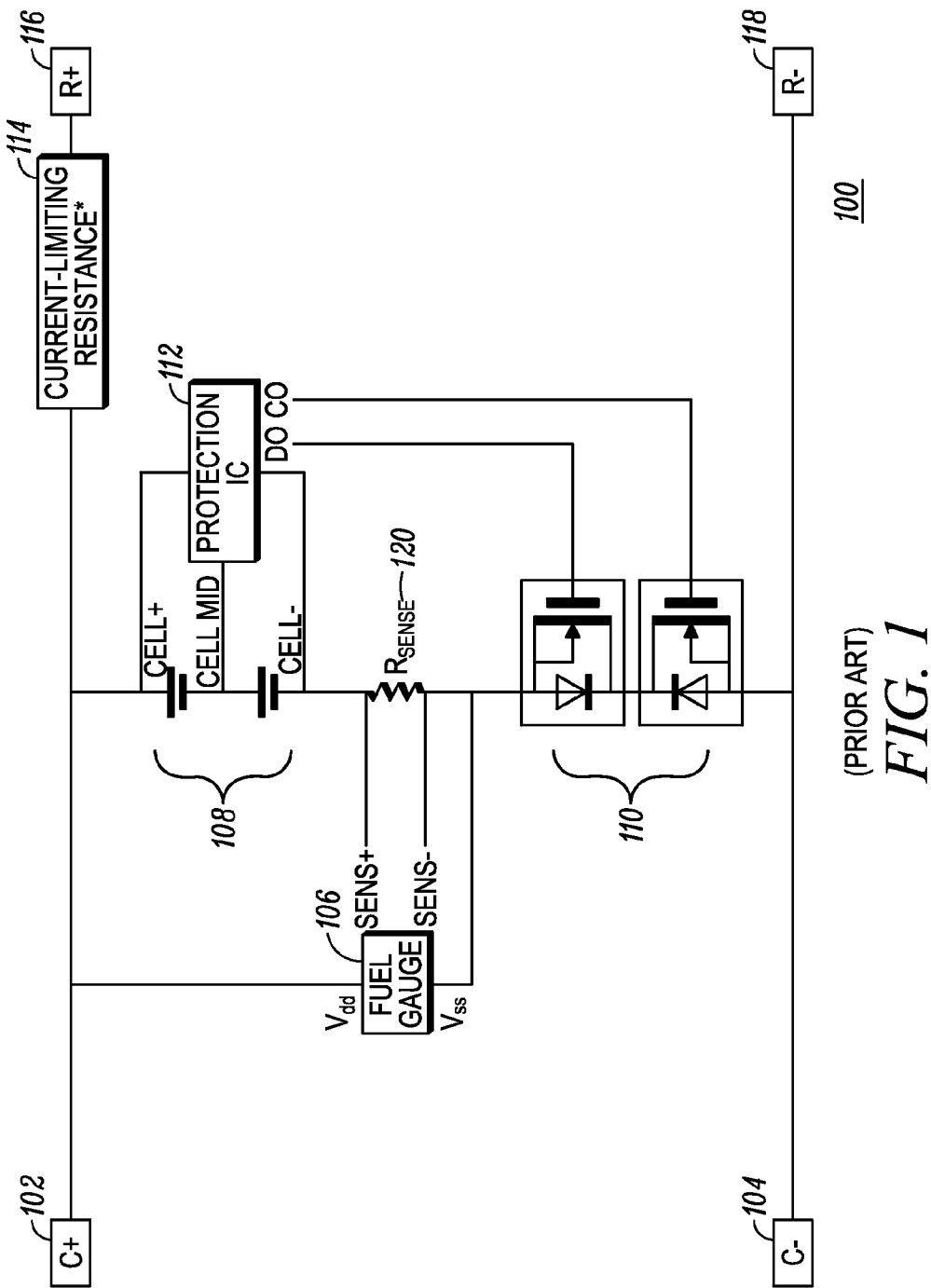
FIG. 1 is a circuit diagram of a conventional battery pack.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Briefly, there is described herein, a method and apparatus for adapting battery cells via switch control logic which enables series/parallel cell switching decisions based on non-complex detection of voltage and charging/discharging status, independent of an attached load or charger. A comparator-type switch control eliminates the need for complex embedded processors, bus controls, or analog-to-digital converters. By selectively switching the battery cells into series or parallel cell configuration, a host device is now able to fully discharge the battery cells, thereby capitalizing on the full available capacity of those battery cells. Since the switch from parallel to series cell configuration doubles the voltage available to the host device, load current is effectively halved, while maintaining equivalent power to the host device. With lower current associated with the higher voltage, voltage drops across pathway resistances are minimized, enabling host devices to consume electrical power more efficiently.

The accompanying figures, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

FIG. 1 is a circuit diagram of a conventional battery pack 100 for coupling to a radio and/or a charger. The battery pack 100 includes battery-charger contacts C+ and C- shown as 102 and 104, respectively, a fuel gauge 106, a plurality of battery cells 108, a plurality of Field Effect Transistors (FETs) 110, a protection Integrated Chip (IC) 112, a current-limiting resistance 114, and battery-radio contacts R+ and R- shown as 116 and 118, respectively, and a sense resistor 120. The battery-charger contacts 102, 104 engage with a corresponding set of contacts in the charger (not shown) during the charging operation of the battery pack 100 to enable the charging of the battery cells 108 in the battery pack 100. The battery cells 108 provide power to the radio through battery-radio contacts 116, 118 during the discharging operation. The fuel gauge 106 monitors the level of charge remaining in the battery cells 108 by measuring the voltage produced by the battery cells 108 across the sense resistor 120. The FETs 110 along with the protection IC 112 protect the battery cells 108 from overcharge, overdischarge and overcurrent conditions. The current limiting resistance 114 imposes an upper limit on the current that may be delivered to the radio in intrinsically-safe applications.

Figure 2:
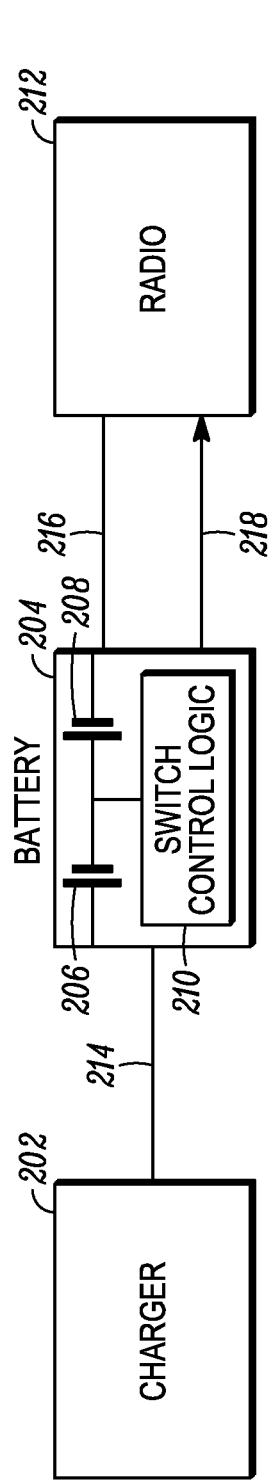
FIG. 2 is a block diagram of a battery pack interface system in accordance with the various embodiments of the present disclosure.

FIG. 2 is a block diagram of a battery pack interface system 200 in accordance with the various embodiments of the present disclosure. The battery pack interface system 200 comprises a charger 202, a battery pack 204 and a host device, for example, radio 212. In accordance with the embodiments of the present disclosure, the battery pack 204 is a rechargeable battery pack comprising a group of one or more electro-chemical cells 206 and 208, such as Nickel-Cadmium, Nickel-Metal-Hydride, and various Lithium-ion chemistries, that can be recharged and used multiple times. With various Lithium-ion chemistries beginning to dominate various Nickel chemistries, the useful voltage range of various Lithium-ion chemistries is expanding from the traditional voltage range between 3.0-4.2V to as low as 2V or as high as 4.5V. The battery pack 204 operates in at least two modes, namely charging mode and discharging mode. In charging mode, the charger 202 is used to charge battery cells 206, 208 in the battery pack 204. The battery pack 204 once charged provides power to the radio 212 through signal 216 and operates in discharging mode. In accordance with some embodiments of the present disclosure, the radio 212 in FIG. 2 can be suitably replaced by any portable electronic device that is capable of being powered by a rechargeable battery.

In accordance with the embodiments of the present disclosure, the battery pack 204 includes a switch control logic 210 that selectively switches the arrangement of the battery cells 206, 208 in the battery pack 204. In particular, the switch control logic 210 switches the battery cells 206, 208 between series and parallel cell configuration thereby allowing the host device to fully discharge the battery cells 206, 208 by capitalizing on the full available capacity of those battery cells 206, 208. Since the switch from parallel to series cell configuration doubles the voltage available to the radio 212, load current is effectively halved, while maintaining equivalent power to the radio 212. With lower current associated with the higher voltage, votlage drops across pathway resistances are minimized enabling the radio 212 to consume electrical power more efficiently. In accordance with some embodiments of the present disclosure, the switch control logic 210 switches the battery cells 206 and 208 from a parallel cell configuration to a series cell combination when the battery cells 206 and 208 have lower charge as compared to the charge required by the radio 212 to operate. Similary, the switch control logic 210 switches the battery cells 206, 208 from a series cell configuration to a parallel cell configuration when the battery cells 206, 208 have a higher charge as compared to the charge required by the radio 212 to operate. In accordance with some embodiments of the present disclosure, the battery pack 204 sends a radio warning signal 218 to the radio before switching the battery cells 206 and 208 from one cell configuration to another. The detailed operation and implementation of the switch control logic 210 is described herein with respect to FIGS. 5-17 below.

Figure 3:
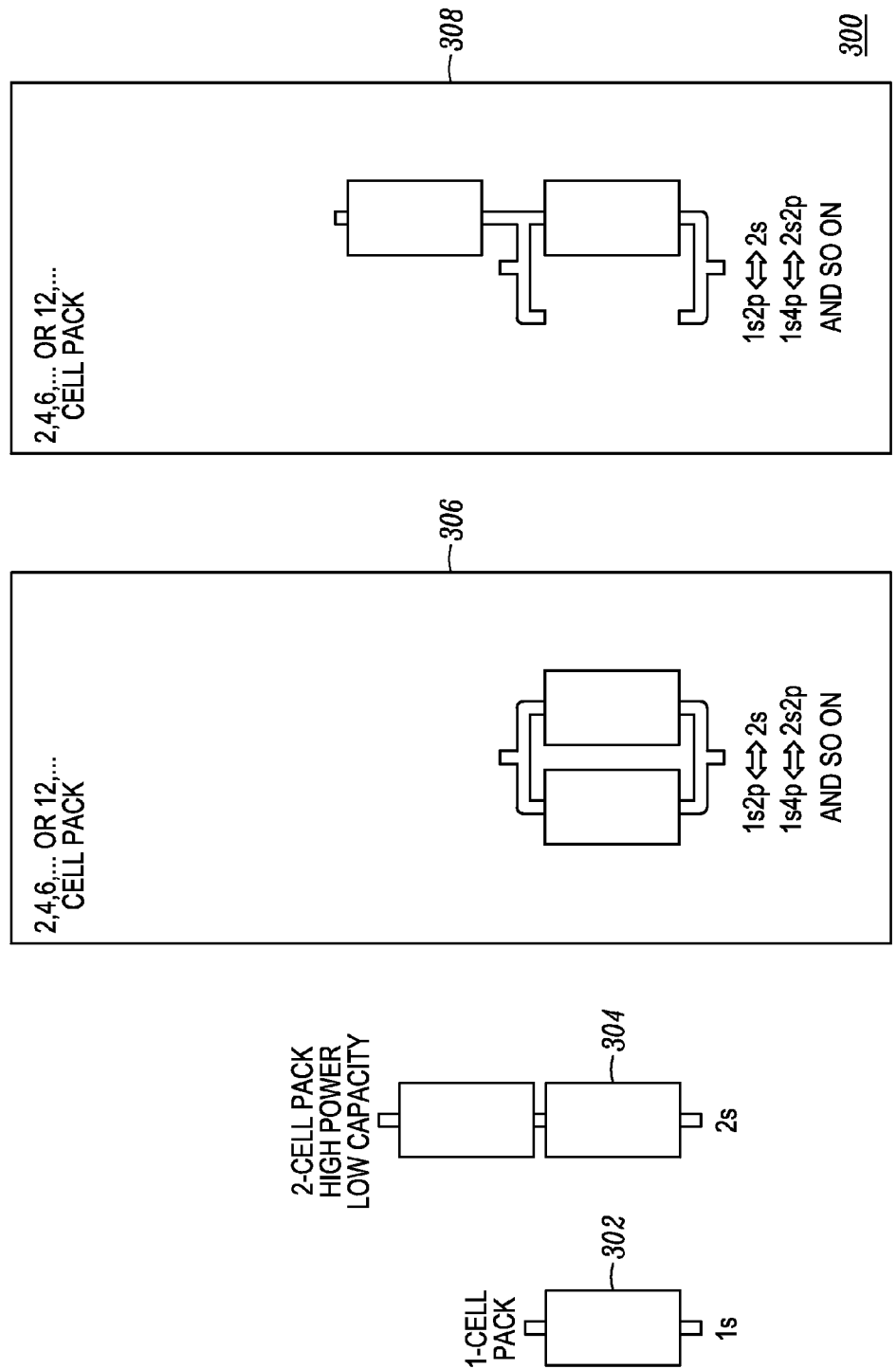
FIGS. 3 and 4 show various arrangements of the battery cells in series and parallel cell configurations in accordance with the various embodiments of the present disclosure.
Figure 4:
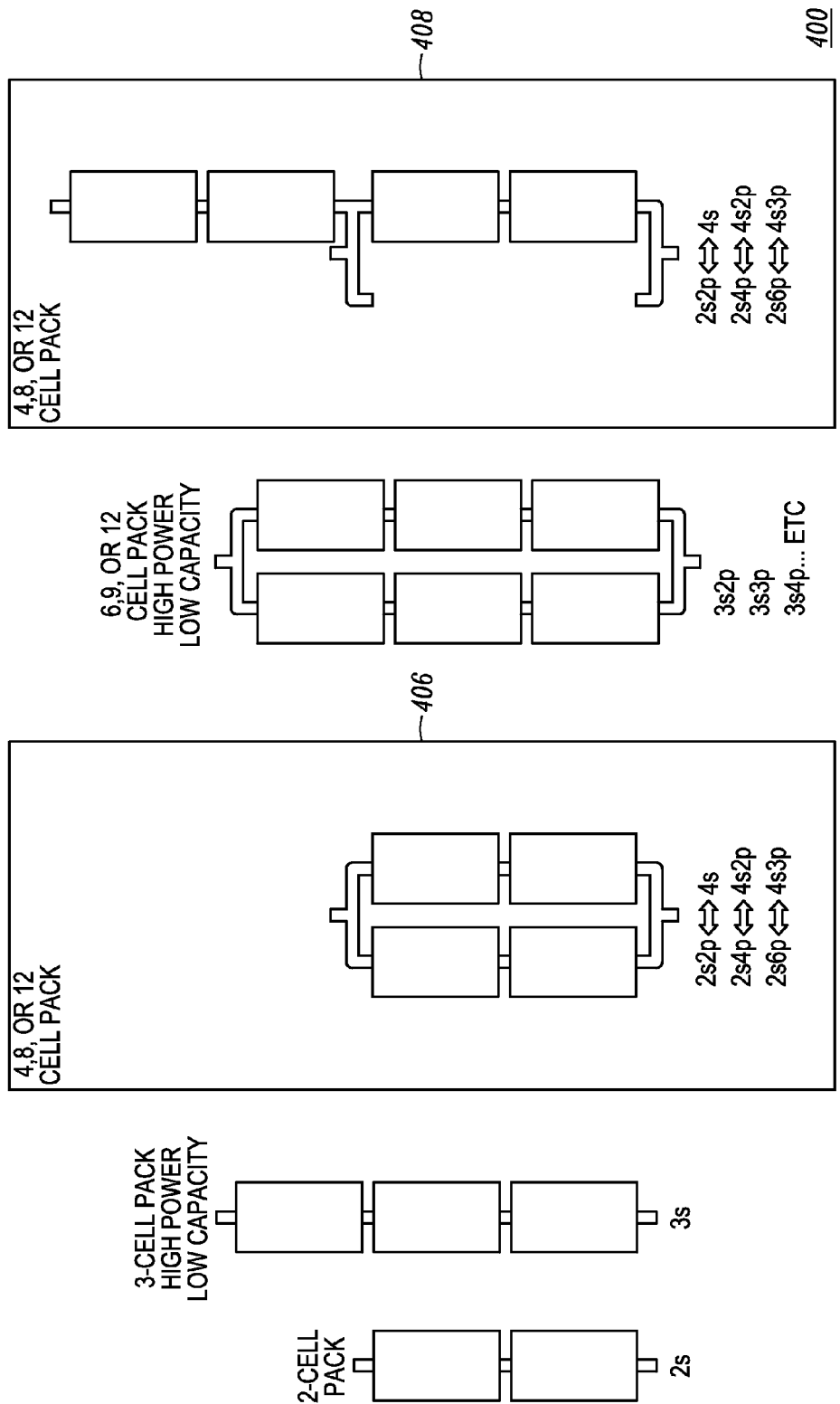

FIGS. 3-4 show various arrangements of the battery cells in series and parallel cell configurations for a battery pack formed and operating in accordance with the various embodiments of the present disclosure. FIG. 3 shows a one-cell battery pack 302 and a two-cell battery pack 304 with two battery cells connected in parallel cell configuration 306 and a series cell configuration 308. The one-cell battery pack 302 and the two-cell battery pack 304 are examples of existing non-switchable batteries represented in FIG. 1. In accordance with some embodiments of the present disclosure, the switch control logic such as the switch control logic 210 of FIG. 2 in the battery pack switches the parallel cell configuration 306 of the battery cells in the two-cell battery pack back to the series cell configuration 308 when the battery cells have lower voltage as compared to the voltage required by the radio 212 to operate. Similarly, FIG. 4 shows a four-cell battery pack in parallel cell configuration 406 where two battery cells are connected in series for each parallel arm and a series cell configuration 408. In accordance with some embodiments of the present disclosure, the switch control logic such as switch control logic 210 shown in FIG. 2 switches the parallel cell configuration 406 of the battery cells in the four-cell battery pack back to the series cell configuration 408 when the battery cells have lower voltage as compared to the voltage required by the radio 212 to operate. The one-cell 302, two-cell battery pack 304 shown in FIGS. 3 and 4 can be suitably replaced by any number of battery cells within the battery pack.

Figure 5:
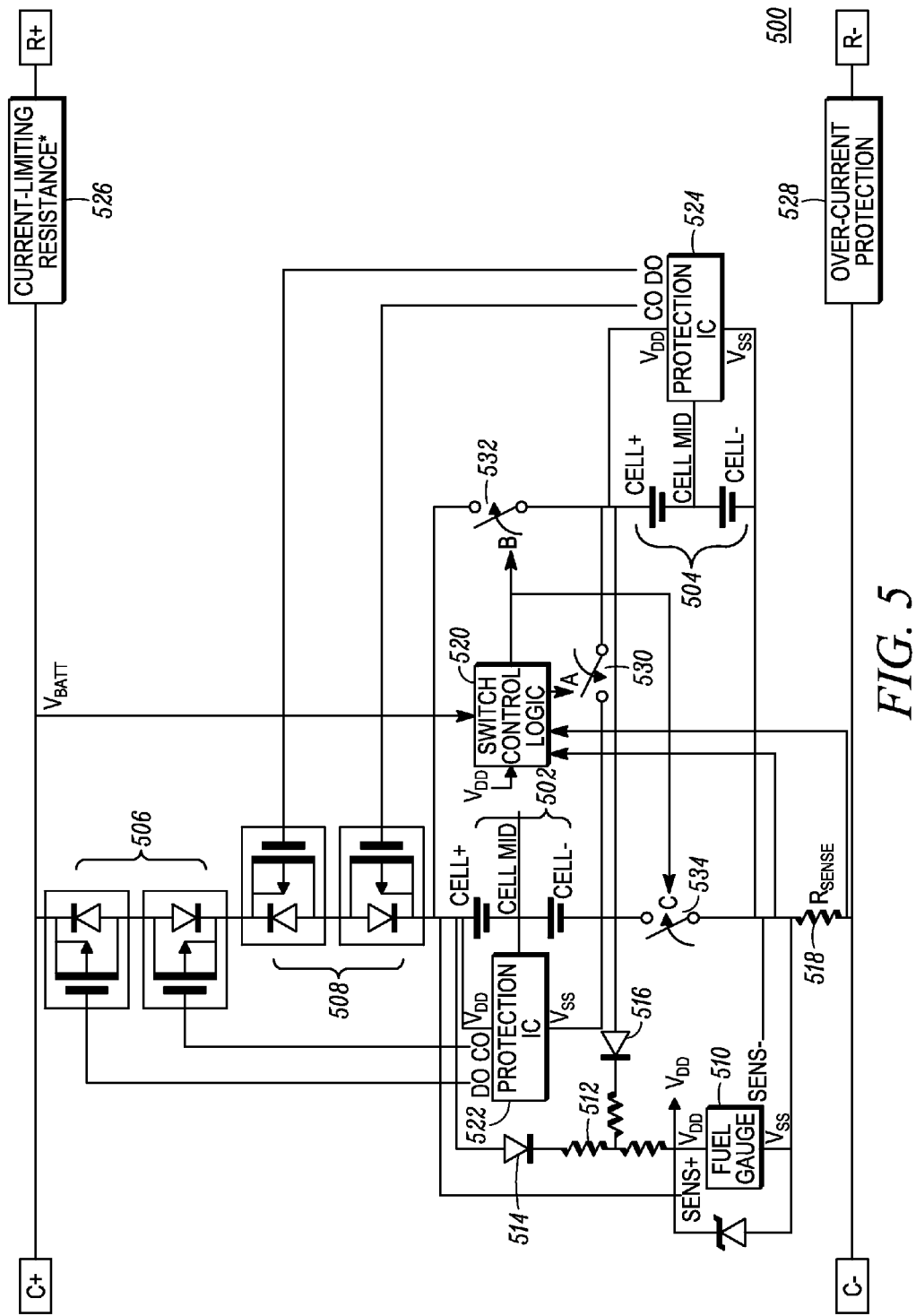
FIG. 5 is a circuit diagram of the battery pack with a voltage modeling fuel gauge in accordance with an embodiment of the present disclosure.

FIG. 5 is a circuit diagram of a battery pack 500 comprising a voltage adaptable battery with a voltage modeling fuel gauge formed and operating in accordance with the various embodiments. Battery pack 500 comprises a plurality of battery cells shown as first cell stack 502 and a second cell stack 504, a plurality of FETS shown as first set of field effect transistors (FETs) 506 and a second set of FETs 508, a voltage modeling fuel gauge 510, pull-up resistors 512, diodes 514, 516, a sense resistor 518, a switch control logic 520, protection IC 522, 524 for the first cell stack 502 and the second cell stack 504 respectively, a current-limiting resistance 526, and an over-current protection circuit 528. The voltage modeling fuel gauge 510 estimates cell state of charge and capacity based on an internal model of the voltage characteristics of the cells. In accordance with some embodiments of the present disclosure, the voltage modeling fuel gauge 510 determines battery capacity and state of charge by monitoring the voltages across the first cell stack 502 and the second cell stack 504 without any need of series sense resistor. The switch control logic 520 selectively couples the first cell stack 502 and the second cell stack 504 in series or in parallel via switch A 530, switch B 532, and switch C 534 as needed, in order to allow the radio 212 to fully discharge the first cell stack 502 and the second cell stack 504 of the battery pack 500. For the purposes of example, in FIG. 5, each battery cell stack 502 and 504 is shown as comprising two cells, however additional cells may be utilized based on power requirements of the radio 212.

In operation, when switch A 530 is open and switches B 532 and C 534 are closed, a parallel cell configuration is achieved (as already shown in FIG. 5). Similarly, when switch A 530 is closed and switches B 532 and C 534 are open, a series cell configuration is achieved. In operation, whenever the first cell stack 502 and the second cell stack 504 generate a lower voltage as compared to the voltage required by the radio 212 to operate, the switch control logic 520 determines the cell configuration in which the first cell stack 502 and the second cell stack 504 are arranged. When the cell configuration is determined to be a parallel cell configuration and the voltage generated at the output terminals R+ and R− of the battery pack 500 is too low, then the switch control logic 520 switches the first cell stack 502 and the second cell stack 504 from the parallel cell configuration to the series cell configuration. By selectively switching the cell configuration from parallel to series, the voltage generated at the output terminals R+ and R− of the battery pack 500 by the first cell stack 502 and the second cell stack 504 can be doubled. Similarly, whenever the first cell stack 502 and the second cell stack 504 generate a higher voltage as compared to the voltage required by the radio 212 to operate, the switch control logic 520 determines the cell configuration in which the first and second cell stacks are arranged. When the cell configuration is determined to be a series cell configuration and the voltage generated at the output terminals R+ and R− of the battery pack 500 is high enough, the switch control logic 520 switches the first cell stack 502 and the second cell stack 504 from the series cell configuration to the parallel cell configuration. By switching the cell configuration from series to parallel, the voltage generated at the output terminals R+ and R− of the battery pack 500 is reduced.

The voltage modeling fuel gauge 510 in the battery pack 500 continuously estimates the level of charge of the first cell stack 502 and the second cell stack 504 and determines the remaining capacity of the first cell stack 502 and the second cell stack 504 by measuring voltage produced by the first cell stack 502 and the second cell stack 504. In accordance with this embodiment, the voltage modeling fuel gauge 510 is powered by either one or both cells stacks 502, 504 with Vss coupled to the low side (SENS−) of the voltage modeling fuel gauge 510. During switching operation, because of the switching of the first cell stack 502 and the second cell stack 504, the voltage produced by the first cell stack 502 and the second cell stack 504 may fall below a minimum operating voltage required by the radio to operate for a predetermined duration (e.g., a fraction of second).

In accordance with some embodiments, during the switching operation, the voltage SENS+ sensed by the voltage modeling fuel gauge 510 will be momentarily interrupted during series/parallel switching. The switch control logic 520 operates independent of the voltage modeling fuel gauge 510. The voltage modeling fuel gauge 510 monitors voltage across the cell stack (not across the sense resistor 518). Hence, the voltage powering the voltage modeling fuel gauge cannot be interrupted by the protection IC 522, 524 or the switching of battery cells from parallel/series cell configuration or series/parallel cell configuration.

In an alternative embodiment, the Vss for voltage modeling fuel gauge 510 may be coupled to C− rather than the high side of sense resistor 518. However, the battery cell voltage model may be affected by the voltage drop across the sense resistor 518. The protection IC 522 and 524 charge FET control output, CO signal, and discharge FET control output, DO signal signals are used to control the first set of FETs 506 and the second set of FETs 508 in order to protect the cells from over-charge, excess-discharge, or short circuiting.

The current-limiting resistance 526 passively limits the current that is provided by the battery pack 500 into a load, particularly an abnormal load such as a shorting item or substance, typically for intrinsically-safe applications. Similarly, the over-current protection circuit 528 actively detects and limits the current that is provided by the battery pack 500 into a load.

Figure 6:
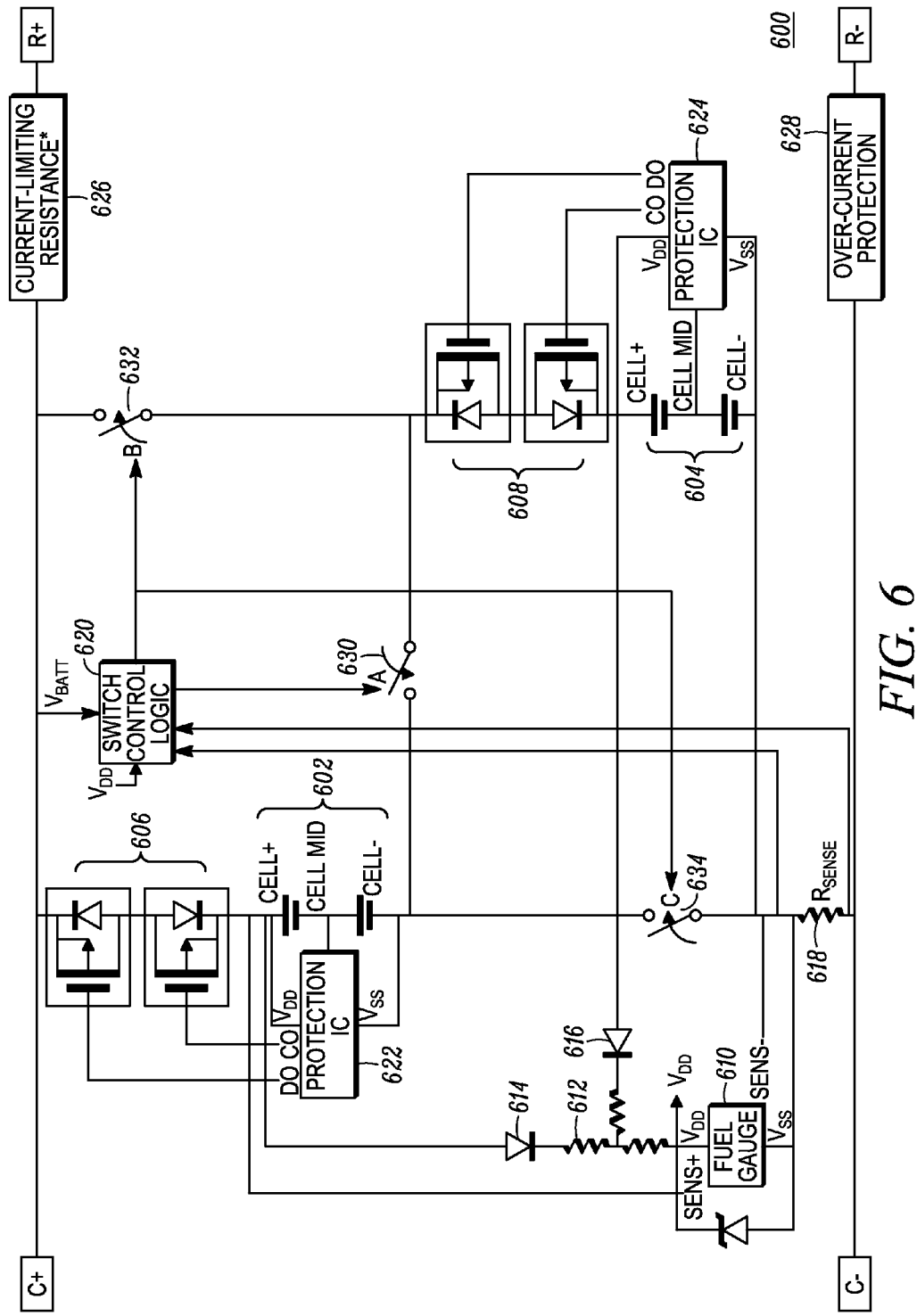
FIG. 6 is a circuit diagram of the battery pack with the voltage modeling fuel gauge having an alternate protection circuit in accordance with another embodiment of the present disclosure.

FIG. 6 is a circuit diagram of a battery pack 600 comprising a voltage adaptable battery with a voltage modeling fuel gauge with an alternate protection concept formed and operating in accordance with the various embodiments. Battery pack 600 comprises a plurality of battery cells shown as first cell stack 602 and a second cell stack 604, a plurality of FETS shown as first set of field effect transistors (FETs) 606 and a second set of FETs 608, a voltage modeling fuel gauge 610, pull-up resistors 612, diodes 614, 616, a sense resistor 618, a switch control logic 620, protection IC 622, 624 for the first cell stack 602 and the second cell stack 604 respectively, a current-limiting resistance 626, and a over-current protection circuit 628. The voltage modeling fuel gauge 610 is a fuel gauge that performs voltage modeling. The switch control logic 620 selectively couples the first cell stack 602 and the second cell stack 604 in series or in parallel via switch A 630, switch B 632, and switch C 634 as needed, in order to allow the radio to fully discharge the first cell stack 602 and the second cell stack 604 in the battery pack 600. For the purposes of example, in FIG. 6, each battery cell stack 602 and 604 is shown as comprising two cells, however additional cells may be utilized based on power requirements.

In operation, when switch A 630 is open and switches B 632 and C 634 are closed, a parallel cell configuration is achieved (as already shown in FIG. 5). Similarly, when switch A 630 is closed and switches B 632 and C 634 are open, a series cell configuration is achieved. In operation, whenever the first cell stack 602 and the second cell stack 604 generate a lower voltage as compared to the voltage required by the radio to operate, the switch control logic 620 determines the cell configuration in which the first cell stack 602 and the second cell stack 604 are arranged. When the cell configuration is determined to be a parallel cell configuration and the voltage generated at the output terminals R+ and R− of the battery pack 600 is too low, then the switch control logic 620 switches the first cell stack 602 and the second cell stack 604 from the parallel cell configuration to the series cell configuration. By selectively switching the cell configuration from parallel to series, the voltage generated at the output terminals R+ and R− of the battery pack 600 by the first cell stack 602 and the second cell stack 604 can be doubled. Similarly, whenever the first cell stack 602 and the second cell stack 604 generate a higher voltage as compared to the voltage required by the radio to operate, the switch control logic 620 determines the cell configuration in which the first and second cell stacks are arranged. When the cell configuration is determined to be a series cell configuration and the voltage generated at the output terminals R+ and R− of the battery pack 600 is high enough, the switch control logic 620 switches the first cell stack 602 and the second cell stack 604 from the series cell configuration to the parallel cell configuration. By selectively switching the cell configuration from series to parallel, the voltage generated at the output terminals R+ and R− of the battery pack 600 is reduced.

The voltage modeling fuel gauge 610 in the battery pack 600 continuously estimates the level of charge of the first cell stack 602 and the second cell stack 604 and determines the remaining capacity of the first cell stack 602 and the second cell stack 604 by measuring voltage produced by the first cell stack 602 and the second cell stack 604. In accordance with this embodiment, the voltage modeling fuel gauge 610 is powered by either one or both cells stacks 602, 604 with Vss coupled to the low side (SENS−) of the voltage modeling fuel gauge 610. During switching operation, because of the switching of the first cell stack 602 and the second cell stack 604, the voltage produced by the first cell stack 602 and the second cell stack 604 may fall below a minimum operating voltage required by the radio to operate for a predetermined duration (e.g., a fraction of second).

In accordance with some embodiments of the present disclosure, during the switching operation, the voltage SENS+ sensed by the voltage modeling fuel gauge 610 will be momentarily interrupted during series/parallel switching. The switch logic operates independent of the fuel gauge. The voltage modeling fuel gauge 610 monitors voltage across the cell stack (not across the sense resistor 618). Hence, the voltage powering the voltage modeling fuel gauge cannot be interrupted by the protection IC 622, 624 or the switching of battery cells from parallel/series cell configuration or series/parallel cell configuration.

In an alternative embodiment, the Vss for voltage modeling fuel gauge 610 may be coupled to C− rather than the high side of sense resistor 618. However, the battery cell voltage model may be affected by the voltage drop across the sense resistor 618. The protection IC 622 charge control output, CO, signal to the charge FET (the lower of the first set of FETs 606) and discharge control output, DO, signal to the discharge control FET (the upper of the first set of FETs 606) are used to protect the cells 602 from over-charge, excess-discharge, or short circuiting. The protection IC 624 charge control output, CO, signal to the charge FET (the lower of the second set of FETs 608) and discharge control output, DO, signal to the discharge control FET (the upper of the second set of FETs 608) are used to protect the cells from over-charge, excess-discharge, or short circuiting.

The current-limiting resistance 626 passively limits the current that is provided by the battery pack 600 into a load, particularly an abnormal load such as a shorting item or substance, typically for intrinsically-safe applications. Similarly, the over-current protection circuit 628 actively detects and limits the current that is provided by the battery pack 600 into a load.

The functioning of the battery pack 600 is similar to the battery pack 700 except that the battery pack 600 provides an alternate protection concept by connecting the second set of FETs 608 directly to the second cell stack 604. Whereas the concept represented by battery pack 500 shown in FIG. 5 switches cell stacks into series or parallel cell configurations, the concept represented by battery pack 600 switches, effectively, batteries into series or parallel cell configuration.

Figure 7:
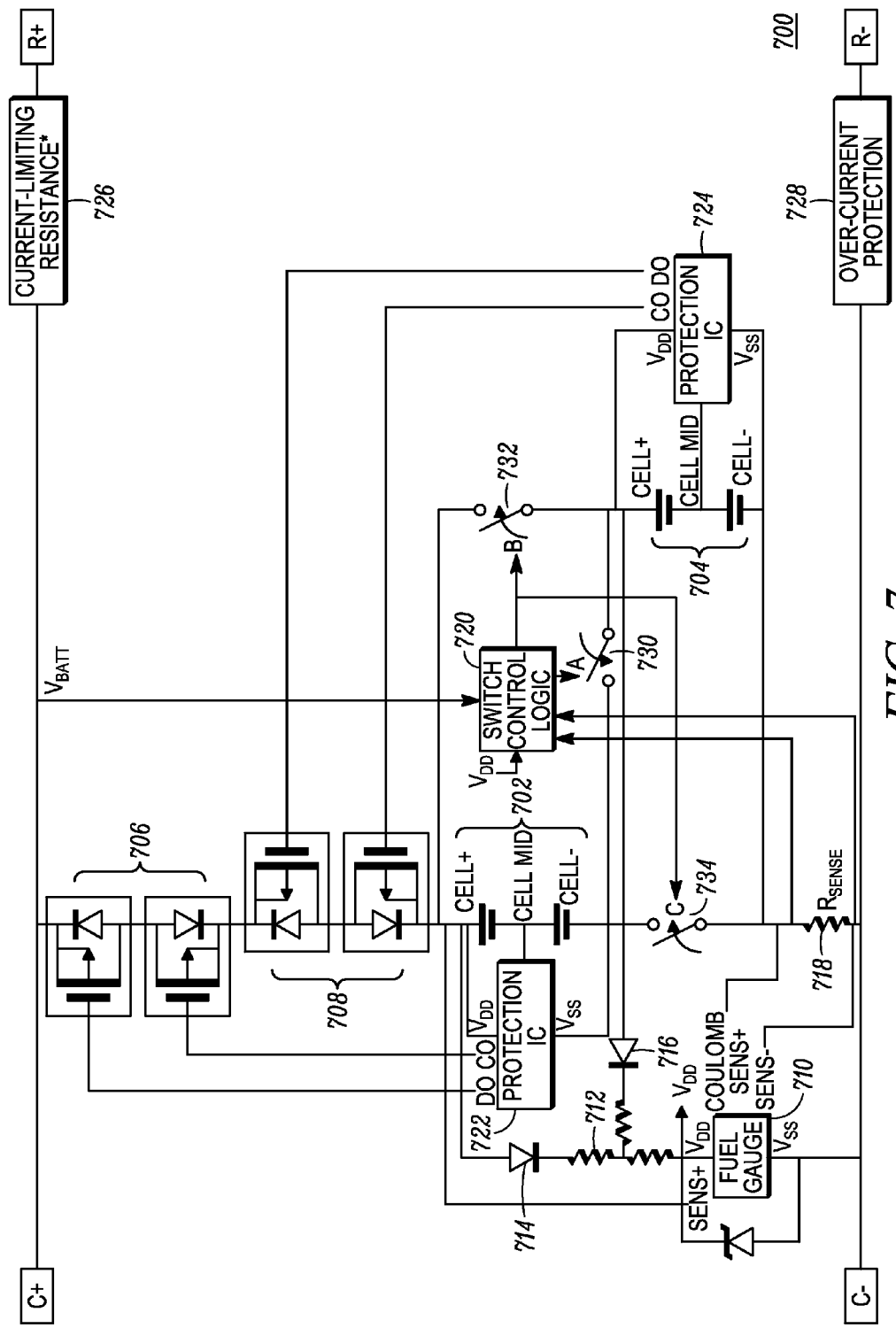
FIG. 7 is a circuit diagram of the battery pack with either a fuel gauge that can perform voltage modeling and coulomb counting or a fuel gauge that can perform impedance modeling in accordance with an embodiment of the present disclosure.

FIG. 7 is a circuit diagram of the battery pack 700 comprising a voltage-adaptable battery with either an impedance-modeling fuel gauge or a fuel gauge that performs integrated voltage-modeling and coulomb-counting formed and operating in accordance with an embodiment of the present disclosure. Battery pack 700 comprises a plurality of battery cells shown here as first cell stack 702 and a second cell stack 704, a plurality of FETS shown here as first set of field effect transistors (FETs) 706 and a second set of FETs 708, a fuel gauge 710 that can be either an impedance-modeling fuel gauge or a fuel gauge that performs voltage modeling and coulomb counting as integrated functions, pull-up resistors 712, diodes 714, 716, a sense resistor 718, a switch control logic 720, protection IC 722, 724 for the first cell stack 702 and the second cell stack 704 respectively, a current-limiting resistance 726, and a over-current protection circuit 728. The switch control logic 720 selectively couples the first cell stack 702 and the second cell stack 704 in series or in parallel via switch A 730, switch B 732, and switch C 734 as needed, in order to allow the radio to fully discharge the first cell stack 702 and the second cell stack 704 of the battery pack 700. For the purposes of example, in FIG. 7, each battery cell stack 702 and 704 is shown as comprising two cells, however additional cells may be utilized based on power requirements.

In operation, when switch A 730 is open and switches B 732 and C 734 are closed, a parallel cell configuration is achieved (as already shown in FIG. 5). Similarly, when switch A 730 is closed and switches B 732 and C 734 are open, a series cell configuration is achieved. In operation, whenever the first cell stack 702 and the second cell stack 704 generate a lower voltage as compared to the voltage required by the radio to operate, then the switch control logic 720 determines the cell configuration in which the first cell stack 702 and the second cell stack 704 are arranged. When the cell configuration is determined to be a parallel cell configuration and the voltage generated at the output terminals R+ and R− of the battery pack 700 is too low, the switch control logic 720 switches the first cell stack 702 and the second cell stack 704 from the parallel to the series cell configuration. By selectively switching the cell configuration from parallel to series, the voltage generated at the output terminals R+ and R− of the battery pack 700 by the first cell stack 702 and the second cell stack 704 can be doubled. Similarly, whenever the first cell stack 702 and the second cell stack 704 generate a higher voltage as compared to the voltage required by the radio to operate, the switch control logic 720 determines the cell configuration in which the first and second cell stacks are arranged. When the cell configuration is determined to be a series cell configuration and the voltage generated at the output terminals R+ and R− of the battery pack 700 is high enough, the switch control logic 720 switches the first cell stack 702 and the second cell stack 704 from the series cell configuration to the parallel cell configuration. By selectively switching the cell configuration from series to parallel, the voltage generated at the output terminals R+ and R− of the battery pack 700 is reduced.

The fuel gauge 710 in the battery pack 700 continuously estimates the level of charge of the first cell stack 702 and the second cell stack 704 and determines the remaining capacity of the first cell stack 702 and the second cell stack 704 by measuring voltage produced by and the electrical current flowing through the first cell stack 702 and the second cell stack 704. In accordance with this embodiment, the fuel gauge 710 is powered by either one or both cells stacks 702, 704 with Vss coupled to the low side (SENS−) of the fuel gauge 710 internally. During switching operation, because of the switching of the first cell stack 702 and the second cell stack 704, the voltage produced by the first cell stack 702 and the second cell stack 704 may fall below a minimum operating voltage required by the radio to operate for a predetermined duration (e.g., a fraction of second).

In accordance with some embodiments of the present disclosure, during the switching operation, the voltage SENSE+ sensed by the fuel gauge 710 will be momentarily interrupted during series/parallel switching. The switch control logic 720 operates independent of the fuel gauge 710. The fuel gauge 710 monitors voltage across the cell stack (not across the sense resistor 718). Hence, the voltage powering the fuel gauge 710 cannot be interrupted by the protection IC 722, 724 or the switching of battery cells from parallel/series cell configuration or series/parallel cell configuration.

In an alternative embodiment, the Vss for the fuel gauge 710 may be coupled to C− rather than the high side of sense resistor 718. However, the battery cell voltage model or cell impedance model may be affected by the voltage drop across the sense resistor 718. The protection IC 722 and 724 charge FET control output, CO signal, and discharge FET control output, DO signal are used to control the first set of FETs 706 and the second set of FETs 708 in order to protect the cells from over-charge, excess-discharge, or short circuiting.

The current-limiting resistance 726 passively limits the current that is provided by the battery pack 700 into a load, particularly an abnormal load such as a shorting item or substance, typically for intrinsically-safe applications. Similarly, the over-current protection circuit 728 actively detects and limits the current that is provided by the battery pack 700 into a load.

Figure 8:
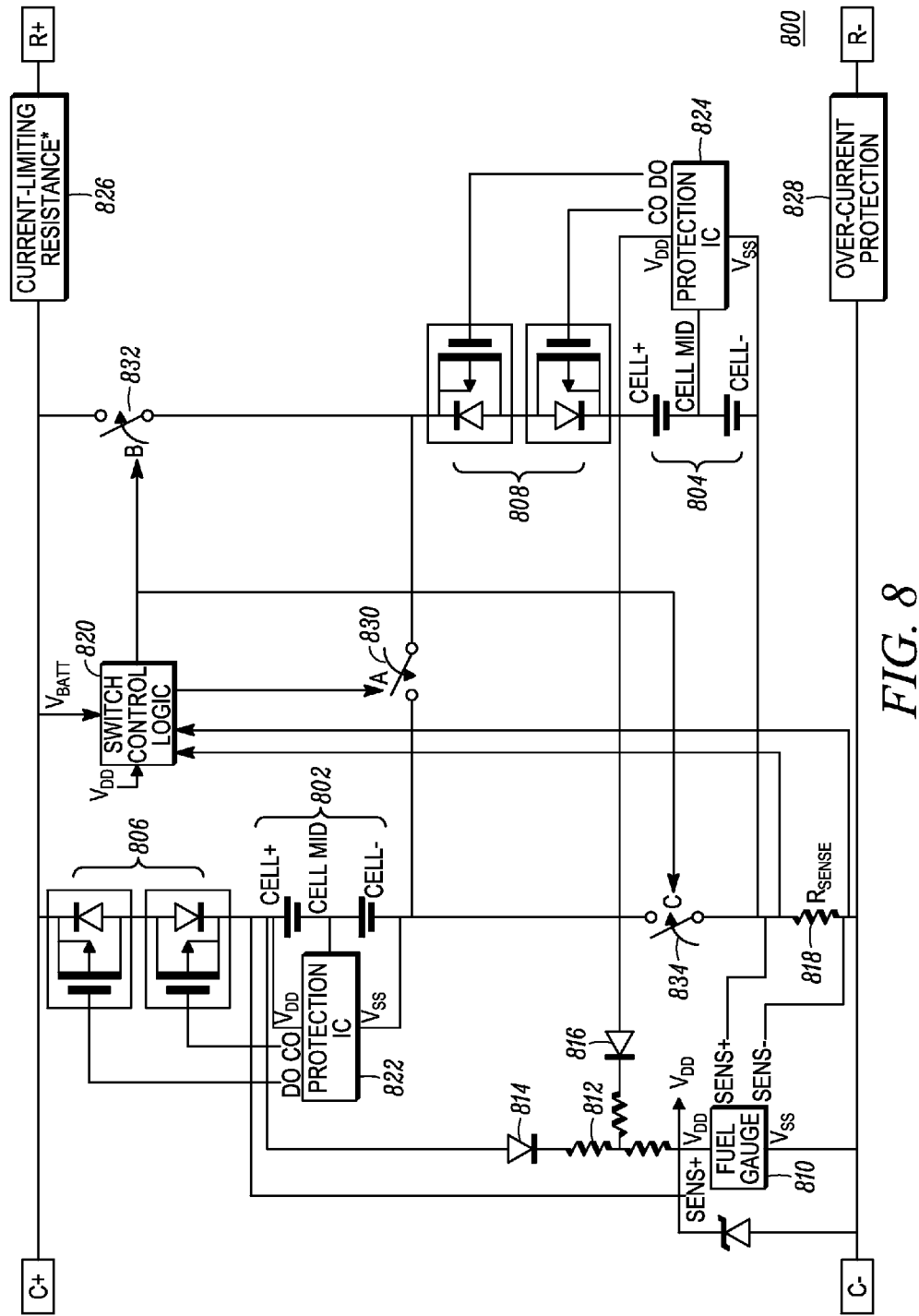
FIG. 8 is a circuit diagram of the battery pack with either a fuel gauge that can perform voltage modeling and coulomb counting or a fuel gauge that can perform impedance modeling having an alternate protection circuitry in accordance with another embodiment of the present disclosure.

FIG. 8 is a circuit diagram of the battery pack with the fuel gauge that can perform either voltage modeling and coulomb counting or impedance modeling having an alternate protection circuitry in accordance with another embodiment of the present disclosure. Battery pack 800 comprises a plurality of battery cells shown here as first cell stack 802 and a second cell stack 804, a plurality of FETS shown here as first set of field effect transistors (FETs) 806 and a second set of FETs 808, a fuel gauge 810 that can be either an impedance-modeling fuel gauge or a fuel gauge that performs voltage modeling and coulomb counting as integrated functions, pull-up resistors 812, diodes 814, 816, a sense resistor 818, a switch control logic 820, protection IC 822, 824 for the first cell stack 802 and the second cell stack 804 respectively, a current-limiting resistance 826, and a over-current protection circuit 828. The switch control logic 820 selectively couples the first cell stack 802 and the second cell stack 804 in series or in parallel via switch A 830, switch B 832, and switch C 834 as needed, in order to allow the radio to fully discharge the first cell stack 802 and the second cell stack 804 of the battery pack 800. For the purposes of example, in FIG. 8, each battery cell stack 802 and 804 is shown as comprising two cells, however additional cells may be utilized based on power requirements.

In operation, when switch A 830 is open and switches B 832 and C 834 are closed, a parallel cell configuration is achieved (as already shown in FIG. 5). Similarly, when switch A 830 is closed and switches B 832 and C 834 are open, a series cell configuration is achieved. In operation, whenever the first cell stack 802 and the second cell stack 804 generate a lower voltage as compared to the voltage required by the radio to operate, then the switch control logic 820 determines the cell configuration in which the first cell stack 802 and the second cell stack 804 are arranged. When the cell configuration is determined to be a parallel cell configuration and the voltage generated at the output terminals R+ and R− of the battery pack 800 is too low, the switch control logic 820 switches the first cell stack 802 and the second cell stack 804 from the parallel to the series cell configuration. By selectively switching the cell configuration from parallel to series, the voltage generated at the output terminals R+ and R− of the battery pack 800 by the first cell stack 802 and the second cell stack 804 can be doubled. Similarly, whenever the first cell stack 802 and the second cell stack 804 generate a higher voltage as compared to the voltage required by the radio to operate, the switch control logic 820 determines the cell configuration in which the first and second cell stacks are arranged. When the cell configuration is determined to be a series cell configuration and the voltage generated at the output terminals R+ and R− of the battery pack 800 is high enough, the switch control logic 820 switches the first cell stack 802 and the second cell stack 804 from the series cell configuration to the parallel cell configuration. By selectively switching the cell configuration from series to parallel, the voltage generated at the output terminals R+ and R− of the battery pack 800 is reduced.

The fuel gauge 810 in the battery pack 800 continuously estimates the level of charge of the first cell stack 802 and the second cell stack 804 and determines the remaining capacity of the first cell stack 802 and the second cell stack 804 by measuring voltage produced by and the electrical current flowing through the first cell stack 802 and the second cell stack 804. In accordance with this embodiment, the fuel gauge 810 is powered by either one or both cells stacks 802, 804 with Vss coupled to the low side (SENS−) of the fuel gauge 810 internally. During switching operation, because of the switching of the first cell stack 802 and the second cell stack 804, the voltage produced by the first cell stack 802 and the second cell stack 804 may fall below a minimum operating voltage required by the radio to operate for a predetermined duration (e.g., a fraction of second).

In accordance with some embodiments of the present disclosure, during the switching operation, the voltage SENSE+ sensed by the fuel gauge 810 will be momentarily interrupted during series/parallel switching. The switch control logic 820 operates independent of the fuel gauge 810. The fuel gauge 810 monitors voltage across the cell stack (not across the sense resistor 818). Hence, the voltage powering the voltage modeling and coulomb counting fuel gauge cannot be interrupted by the protection IC 822, 824 or the switching of battery cells from parallel/series cell configuration or series/parallel cell configuration.

In an alternative embodiment, the Vss for the fuel gauge 810 may be coupled to C− rather than the high side of sense resistor 818. However, the battery cell voltage model may be affected by the voltage drop across the sense resistor 818. The protection IC 822 charge control output, CO, signal to the charge FET (the lower of the first set of FETs 806) and discharge control output, DO, signal to the discharge control FET (the upper of the first set of FETs 806) are used to protect the cells 802 from over-charge, excess-discharge, or short circuiting. The protection IC 824 charge control output, CO, signal to the charge FET (the lower of the second set of FETs 608) and discharge control output, DO, signal to the discharge control FET (the upper of the second set of FETs 808) are used to protect the cells from over-charge, excess-discharge, or short circuiting.

The current-limiting resistance 826 passively limits the current that is provided by the battery pack 800 into a load, particularly an abnormal load such as a shorting item or substance, typically for intrinsically-safe applications. Similarly, the over-current protection circuit 828 actively detects and limits the current that is provided by the battery pack 800 into a load.

The functioning of the battery pack 800 is similar to the battery pack 700 except that the battery pack 800 provides an alternate protection concept by connecting the second set of FETs 1008 directly to the second cell stack 1004. Whereas the concept represented by battery pack 700 switches cell stacks into series or parallel cell configurations, the concept represents by battery pack 800 switches effectively batteries into series or parallel cell configuration.

Figure 9:
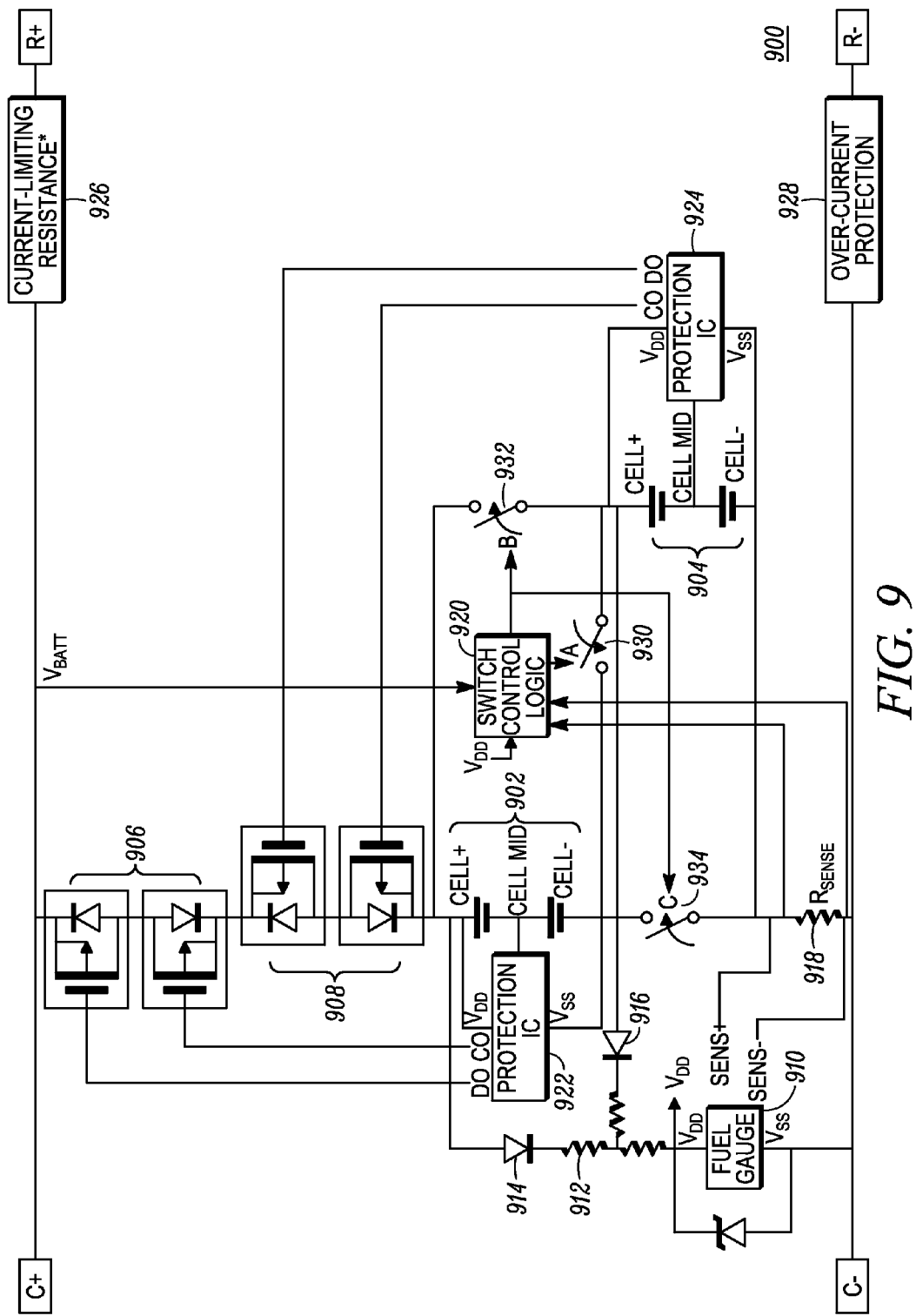
FIG. 9 is a circuit diagram of the battery pack with a coulomb counting fuel gauge in accordance with an embodiment of the present disclosure.

FIG. 9 is a circuit diagram of a battery pack 900 with a coulomb counting fuel gauge formed and operating in accordance with the various embodiments. Battery pack 900 comprises a plurality of battery cells shown here as first cell stack 902 and a second cell stack 904, a plurality of FETS shown here as first set of field effect transistors (FETs) 906 and a second set of FETs 908, coulomb counting fuel gauge 910, pull-up resistors 912, diodes 914, 916, a sense resistor 918, a switch control logic 920, protection IC 922, 924 for the first cell stack 902 and the second cell stack 904 respectively, a current-limiting resistance 926, and a over-current protection circuit 928. The coulomb counting fuel gauge 910 determines battery pack capacity and state of charge by monitoring the voltage magnitude and polarity developed across a sense resistor in series with the first cell stack 902 and the second cell stack 904. The switch control logic 920 selectively couples the first cell stack 902 and the second cell stack 904 in series or in parallel via switch A 930, switch B 932, and switch C 934 as needed, in order to allow the radio 212 to fully discharge the first cell stack 902 and the second cell stack 904 in the battery pack 900. For the purposes of example, in FIG. 9, each battery cell stack 902 and 904 is shown as comprising two cells, however additional cells may be utilized based on power requirements.

In operation, when switch A 930 is open and switches B 932 and C 934 are closed, a parallel cell configuration is achieved (as already shown in FIG. 5). Similarly, when switch A 930 is closed and switches B 932 and C 934 are open, a series cell configuration is achieved. In operation, whenever the first cell stack 902 and the second cell stack 904 generate a lower voltage as compared to the voltage required by the radio 212 to operate, the switch control logic 920 determines the cell configuration in which the first cell stack 902 and the second cell stack 904 are arranged. When the cell configuration is determined to be a parallel cell configuration and the voltage generated at the output terminals R+ and R− of the battery pack 900 is too low, then the switch control logic 920 switches the first cell stack 902 and the second cell stack 904 from the parallel cell configuration to the series cell configuration. By selectively switching the cell configuration from parallel to series, the charge generated at the output terminals R+ and R− of the battery pack 900 by the first cell stack 902 and the second cell stack 904 can be doubled. Similarly, whenever the first cell stack 902 and the second cell stack 904 generate a higher voltage as compared to the voltage required by the radio 212 to operate, the switch control logic 920 determines the cell configuration in which the first and second cell stacks are arranged. When the cell configuration is determined to be a series cell configuration and the voltage generated at the output terminals R+ and R− of the battery pack 900 is high enough, the switch control logic 920 switches the first cell stack 902 and the second cell stack 904 from the series cell configuration to the parallel cell configuration. By selectively switching the cell configuration from series to parallel, the voltage generated at the output terminals R+ and R− of the battery pack 900 is reduced.

The coulomb counting fuel gauge 910 in the battery pack 900 continuously estimates the level of charge of the first cell stack 902 and the second cell stack 904 and determines the remaining capacity of the first cell stack 902 and the second cell stack 904 by measuring the electrical current flowing through the first cell stack 902 and the second cell stack 904.

In accordance with this embodiment, the coulomb counting fuel gauge 910 is powered by either one or both cells stacks 902, 904 with Vss coupled to the low side (SENS−) of the coulomb counting fuel gauge 910. During switching operation, because of the switching of the first cell stack 902 and the second cell stack 904, the voltage produced by the first cell stack 902 and the second cell stack 904 may fall below a minimum operating voltage required by the radio 212 to operate for a predetermined duration (e.g., a fraction of second).

In accordance with some embodiments of the present disclosure, during the switching operation, the voltage SENS+ sensed by the coulomb counting fuel gauge 910 will be momentarily interrupted during series/parallel switching. The switch control logic 920 operates independent of the coulomb counting fuel gauge 910. The coulomb counting fuel gauge 910 monitors voltage across the cell stack (not across the sense resistor 918). Hence, the voltage powering the coulomb counting fuel gauge cannot be interrupted by the protection IC 922, 924 or the switching of battery cells from parallel/series cell configuration or series/parallel cell configuration.

In an alternative embodiment, the Vss for coulomb counting fuel gauge 910 may be coupled to C− rather than the high side of sense resistor 918. The protection IC 922 charge control output, CO, signal to the charge FET (the lower of the first set of FETs 906) and discharge control output, DO, signal to the discharge control FET (the upper of the first set of FETs 906) are used to protect the cells 902 from over-charge, excess-discharge, or short circuiting. The protection IC 924 charge control output, CO, signal to the charge FET (the lower of the second set of FETs 908) and discharge control output, DO, signal to the discharge control FET (the upper of the second set of FETs 908) are used to protect the cells from over-charge, excess-discharge, or short circuiting.

The current-limiting resistance 926 passively limits the current that is provided by the battery pack 900 into a load, particularly an abnormal load such as a shorting item or substance, typically for instrinsically-safe applications. Similarly, the over-current protection circuit 928 actively detects and limits the current that is provided by the battery pack 900 into a load.

Figure 10:
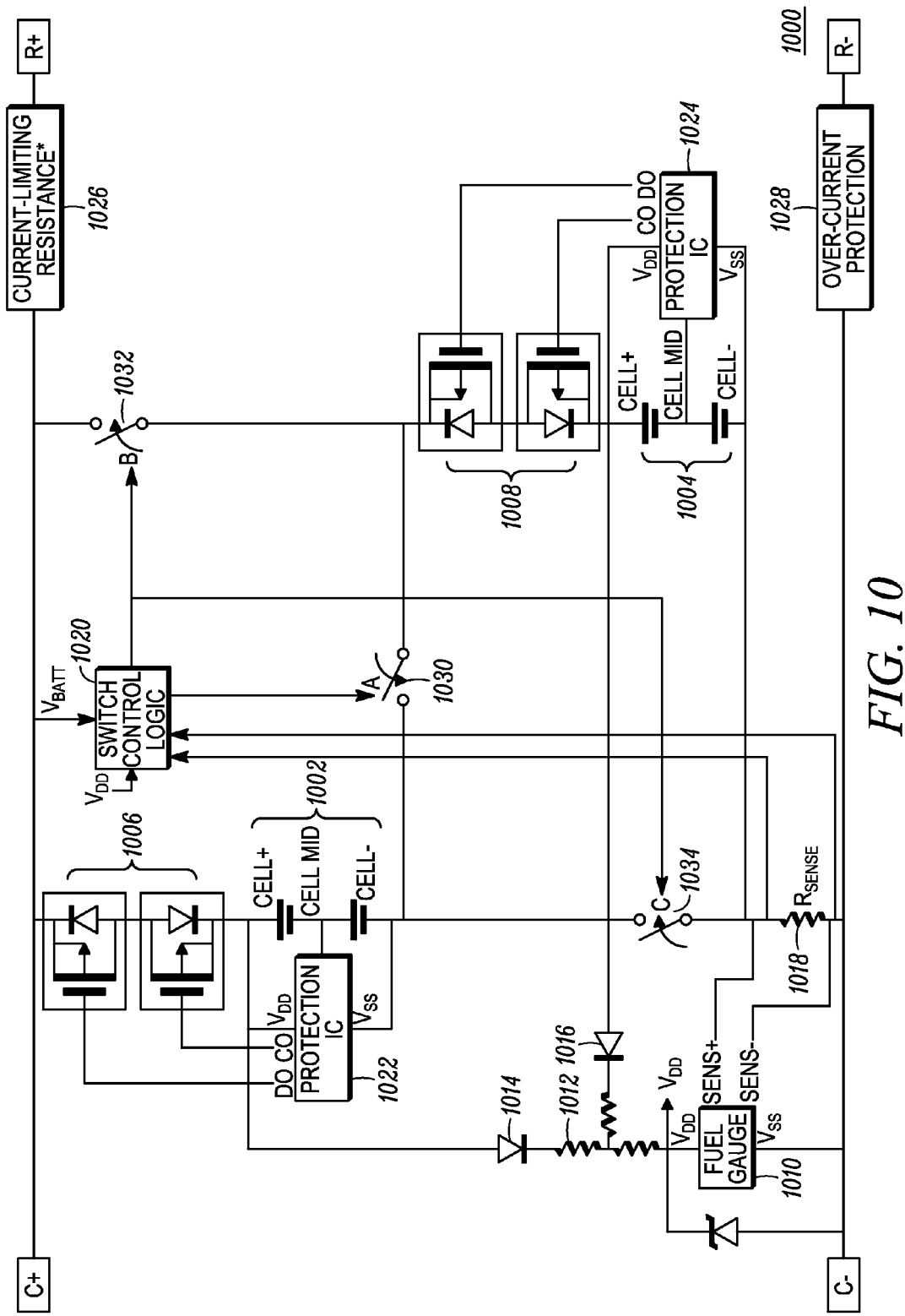
FIG. 10 is a circuit diagram of the battery pack with the coulomb counting fuel gauge having an alternate protection circuitry in accordance with another embodiment of the present disclosure.

FIG. 10 is a circuit diagram of a battery pack 1000 with a coulomb counting fuel gauge with an alternate protection concept formed and operating in accordance with the various embodiments. Battery pack 1000 comprises a plurality of battery cells shown here as first cell stack 1002 and a second cell stack 1004, a plurality of FETS shown here as first set of field effect transistors (FETs) 1006 and a second set of FETs 1008, coulomb counting fuel gauge 1010, pull-up resistors 1012, diodes 1014, 1016, a sense resistor 1018, a switch control logic 1020, protection IC 1022, 1024 for the first cell stack 1002 and the second cell stack 1004 respectively, a current-limiting resistance 1026, and a over-current protection circuit 1028. The switch control logic 1020 selectively couples the first cell stack 1002 and the second cell stack 1004 in series or in parallel via switch A 1030, switch B 1032, and switch C 1034 as needed, in order to allow the radio 212 to fully discharge the first cell stack 1002 and the second cell stack 1004 in the battery pack 1000. For the purposes of example, in FIG. 10, each battery cell stack 1002 and 1004 is shown as comprising two cells, however additional cells may be utilized based on power requirements.

In operation, when switch A 1030 is open and switches B 1032 and C 1034 are closed, a parallel cell configuration is achieved (as already shown in FIG. 5). Similarly, when switch A 1030 is closed and switches B 1032 and C 1034 are open, a series cell configuration is achieved. In operation, whenever the first cell stack 1002 and the second cell stack 1004 generate a lower voltage as compared to the voltage required by the radio 212 to operate, the switch control logic 1020 determines the cell configuration in which the first cell stack 1002 and the second cell stack 1004 are arranged. When the cell configuration is determined to be a parallel cell configuration and the voltage generated at the output terminals R+ and R− of the battery pack 1000 is too low, then the switch control logic 1020 switches the first cell stack 1002 and the second cell stack 1004 from the parallel cell configuration to the series cell configuration. By selectively switching the cell configuration from parallel to series, the charge generated at the output terminals R+ and R− of the battery pack 1000 by the first cell stack 1002 and the second cell stack 1004 can be doubled. Similarly, whenever the first cell stack 1002 and the second cell stack 1004 generate a higher voltage as compared to the voltage required by the radio 212 to operate, the switch control logic 1020 determines the cell configuration in which the first and second cell stacks are arranged. When the cell configuration is determined to be a series cell configuration and the voltage generated at the output terminals R+ and R− of the battery pack 1000 is high enough, the switch control logic 1020 switches the first cell stack 1002 and the second cell stack 1004 from the series cell configuration to the parallel cell configuration. By selectively switching the cell configuration from series to parallel, the voltage generated at the output terminals R+ and R− of the battery pack 1000 is reduced.

The coulomb counting fuel gauge 1010 in the battery pack 1000 continuously estimates the level of charge of the first cell stack 1002 and the second cell stack 1004 and determines the remaining capacity of the first cell stack 1002 and the second cell stack 1004 by measuring the electrical current flowing through the first cell stack 1002 and the second cell stack 1004. In accordance with this embodiment, the coulomb counting fuel gauge 1010 is powered by either one or both cells stacks 1002, 1004 with Vss coupled to the low side (SENS−) of the coulomb counting fuel gauge 1010. During switching operation, because of the switching of the first cell stack 1002 and the second cell stack 1004, the voltage produced by the first cell stack 1002 and the second cell stack 1004 may fall below a minimum operating voltage required by the radio 212 to operate for a predetermined duration (e.g., a fraction of second).

In accordance with some embodiments of the present disclosure, during the switching operation, the voltage SENS+ sensed by the coulomb counting fuel gauge 1010 will be momentarily interrupted during series/parallel switching. The switch control logic 1020 operates independent of the coulomb counting fuel gauge 1010. The coulomb counting fuel gauge 1010 monitors voltage across the cell stack (not across the sense resistor 1018). Hence, the voltage powering the coulomb counting fuel gauge cannot be interrupted by the protection IC 1022, 1024 or the switching of battery cells from parallel/series cell configuration or series/parallel cell configuration.

In an alternative embodiment, the Vss for coulomb counting fuel gauge 1010 may be coupled to C− rather than the high side of sense resistor 1018. The protection IC 1022 charge control output, CO, signal to the charge FET (the lower of the first set of FETs 1006) and discharge control output, DO, signal to the discharge control FET (the upper of the first set of FETs 1006) are used to protect the cells 1002 from over-charge, excess-discharge, or short circuiting. The protection IC 1024 charge control output, CO, signal to the charge FET (the lower of the second set of FETs 1008) and discharge control output, DO, signal to the discharge control FET (the upper of the second set of FETs 1008) are used to protect the cells from over-charge, excess-discharge, or short circuiting.

The current-limiting resistance 1026 passively limits the current that is provided by the battery pack 1000 into a load, particularly an abnormal load such as a shorting item or substance, typically for intrinsically-safe applications. Similarly, the over-current protection circuit 1028 actively detects and limits the current that is provided by the battery pack 1000 into a load.

The functioning of the battery pack 1000 is similar to the battery pack 900 except that the battery pack 1000 provides an alternate protection concept by connecting the second set of FETs 1008 directly to the second cell stack 1004. Whereas the concept represented by battery pack 900 switches cell stacks into series or parallel cell configurations, the concept represented by the battery pack 1000 switches, effectively, batteries into series or parallel cell configuration.

Figure 11:
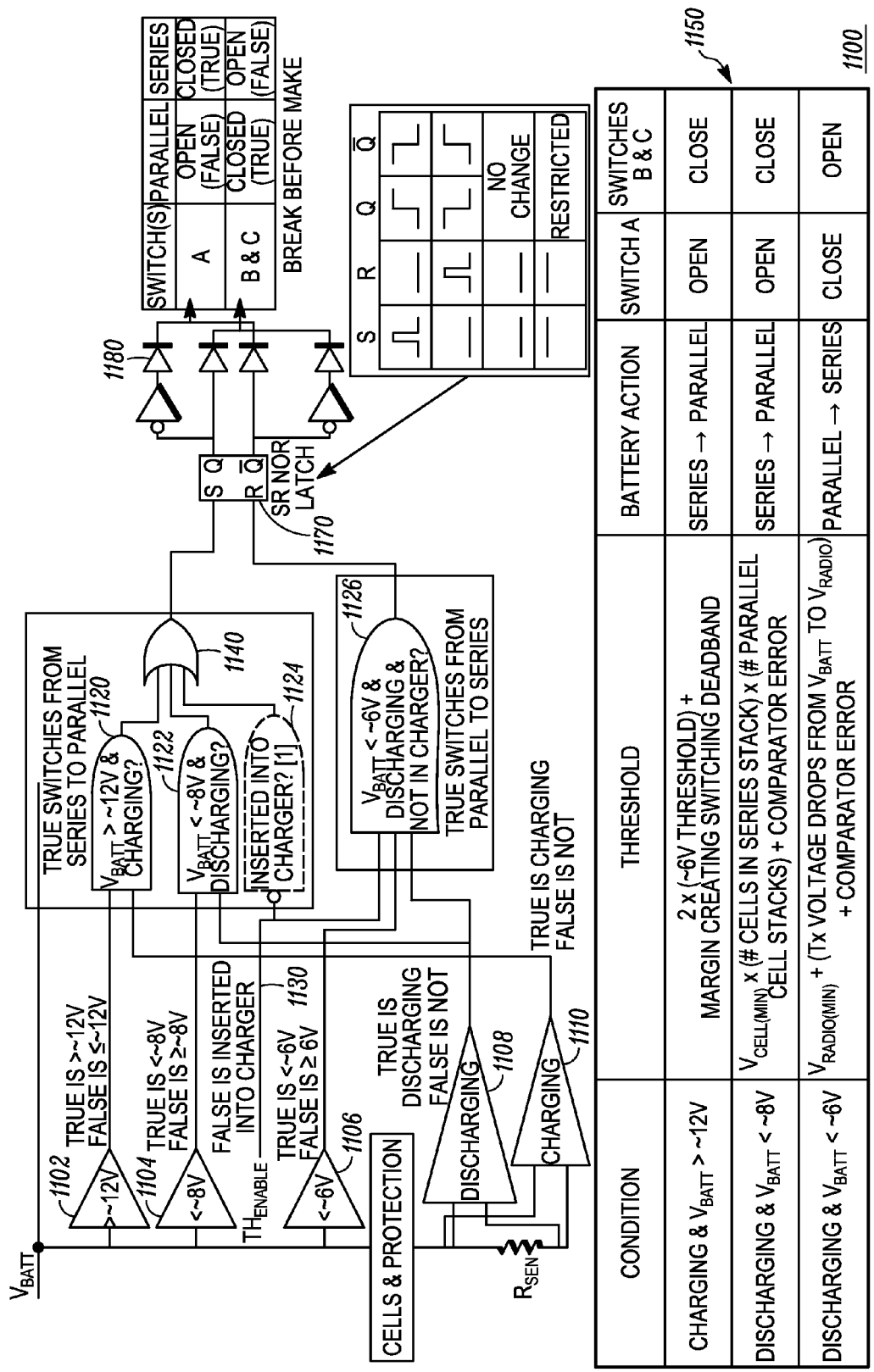
FIG. 11 is a switch control logic diagram illustrating prioritized battery charging state in accordance with the various embodiments of the present disclosure.
Figure 12:
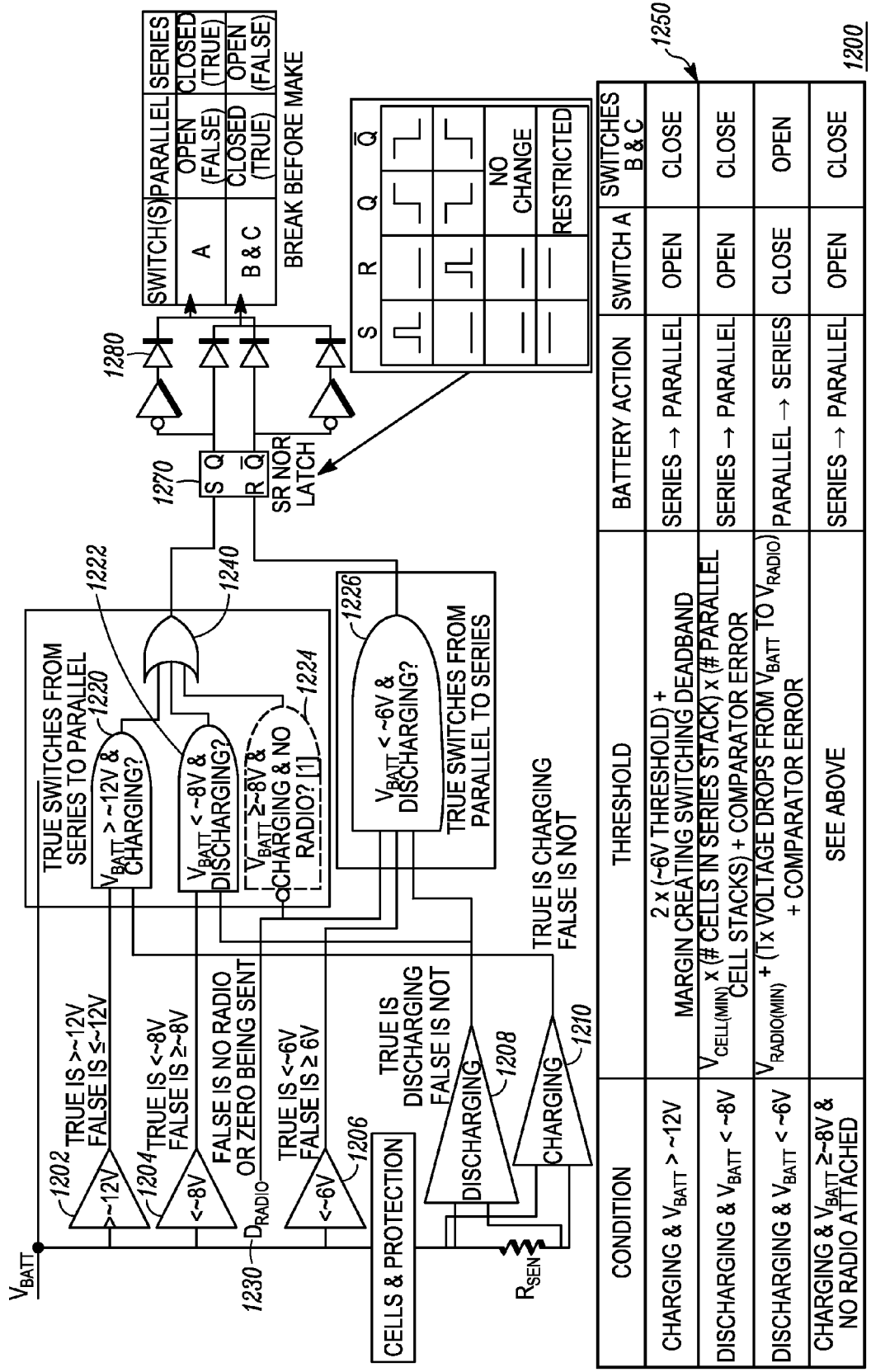
FIG. 12 is a switch control logic diagram with an option to avoid radio resets in accordance with the various embodiments.

Referring to FIGS. 11 and 12, the switch control logic 210 is shown in accordance with the embodiments 1100 and 1200. In accordance with the embodiments of the present disclosure, the switch control logic 210 is the switch control logic 520, 620, 720, 820, 920, 1020 shown in FIGS. 5-10. The switch control logic 210 is the same for both figures, but the conditions within which the battery pack 204 is operating are different. FIG. 11 provides a means for prioritizing battery charging (charger 202 operation), while FIG. 12 provides a means for avoiding radio 212 resets (radio 212 operation). Thus, the switch control logic 210 located within the battery pack 204 negates the need to alter the charger 202 or radio 212.

In one embodiment, the switch control logic 210 is located within the battery pack 204 to minimize the number of battery-radio 212/battery charger 202 contacts needed for interfacing with a radio 212 and a charger 202 respectively. The switch control logic 210 comprises a plurality of comparators 1102, 1104, 1106, each having a predetermined threshold that is set in accordance with minimum, intermediate or maximum cell voltage(s). These thresholds, that are predetermined based on cell voltages, may be stored in a memory (not shown) within the battery pack 204 for use by charger 202 or radio 212. Switch control logic 210 further comprises, separate discharging and charging comparators 1108, 1110 for determining whether the battery pack 204 is in a charging mode or discharging mode. The discharging comparator 1108 and the charging comparators 1110 do not generate a switch command when the battery is in a quiescent mode (neither charging nor discharging). A thermistor enable line, $Th_{Enable}$, 1130 detects insertion of the battery pack 204 into the charger 202.

The plurality of comparators 1102, 1104, 1106 are each respectively coupled to a plurality of logic AND gates 1120, 1122, 1124. Outputs from the AND gates 1120, 1122, 1124 are coupled to an OR gate 1140 to generate an output. The output of the OR gate 1140 is coupled to a latch for example, a SR NOR Latch 1170. The latch 1170 outputs Q, $\overline{Q}$ are coupled to inverters and diodes 1180 to generate the open and close controls for the switches A, B, and C.

In operation, when the battery pack voltage exceeds the maximum series-configuration threshold herein named maximum threshold voltage (e.g., ~12V maximum charger and/or radio limit) at the comparator 1102, and the charging comparator 1110 indicates a charge condition, then an AND gate 1120 generates a logic level high. When the battery pack voltage is less than an minimum series-configuration threshold herein named as an intermediate threshold voltage (e.g., ~8V or ~2V per 4 cells in series) at comparator 1104, and the discharging comparator 1108 indicates a discharge condition, then the AND gate 1122 generates a logic level high. When the thermistor enable line $Th_{Enable}$ 1130 indicates that the battery pack is inserted into the charger 202, then a logic level (for example, logic level 1) is generated at logic gate 1324. These three logic level high inputs from the logic AND gates 1120 and 1122 and the logic NAND gate 1124 to the OR gate 1140 generate a high for example, logic level 1 signal to the set input of the latch 1170. Setting the latch 1170, while the latch Reset input remains low, sets the latch Q output and clears the latch $\overline{Q}$ output. These latch outputs Q, $\overline{Q}$ drive an array of invertors and diodes 1180 to open or close switches A (shown as 530, 630, 730, 830, 930, and 1130 as shown in FIGS. 5-10), B (532, 632, 732, 832, 932, and 1032 as shown in FIGS. 5-10), and C (534, 634, 734, 834, 934, and 1134 as shown in FIGS. 5-10). In operation, when the battery pack voltage is less than the minimum necessary voltage required for radio operation at the comparator 1106, and the discharging comparator 1108 indicates a discharge condition and the thermistor enable line $Th_{Enable}$ 1130 indicates that the battery pack is removed from the charger 202, then a logic level (for example, logic level 1) is generated at logic gate 1126 which further resets the SR NOR Latch 1170, thereby reconfiguring the switches from parallel cell configuration to series cell configuration.

As shown in FIG. 11, the third comparator 1106 is set to have a minimum threshold voltage of 6 V. The output of the third comparator 1106 is provided to the logic AND gate 1126 that determines whether the battery pack is in the charger or not, whether the battery pack is in discharging state or not (i.e. whether the battery pack is connected to the radio and is being discharged or not or whether the battery pack is connected to the charger and is being discharged or not by the charger), and whether its voltage is dropped below the minimum threshold volatge for radio operation (e.g., ~6V) or not. Based upon the above conditions, the AND gate 1126 output to the SR nor Latch 1170 switches the battery cells in the battery pack from the parallel cell configuration to a series cell configuration to increase battery pack voltage available to the radio, enabling the radio to use energy available in new-technology cells. The operation for the thresholds of the comparators set forth in the above example provides for the switch conditions shown in the table 1150 of FIG. 11.

Further, FIG. 12 also shows an embodiment 1200 for the switch control logic 210 with an option of avoiding a reset to radio 212. In FIG. 12, a detect radio line 1230 is provided to determine if the radio 212 is connected to the battery pack 204 or not. The detect radio line 1230 generates an high signal for example, logic level 1 signal that is provided to the AND gates 1220 and 1222, and the NAND gate 1224 along with the inputs from the comparators 1202, 1204, 1206, 1208, and 1210 as described above in FIG. 11. The outputs of the AND gates 1220 and 1222, and the NAND gate 1224 are then provided to an OR gate 1240 and further to a latch for example, an SR nor latch 1270 that determines whether there is a need to switch the battery cells configuration in the battery pack 204 or not. Thus, the switch control logic 210 of the battery pack 204 in accordance with various embodiments of the present disclosure overcomes this problem by preventing a low-voltage, parallel-configured, discharging battery from switching to series configuration and momentarily interrupting power to the radio 212. Similarly, a series-configured, charging battery pack with a voltage greater than an minimum series-configuration threshold voltage herein named as intermediate threshold voltage (e.g., ~8V or ~2V for 4 series cells) is prevented from switching to parallel cell configuration when the radio 212 is attached, avoiding momentary interruption of power to the radio 212. Further, the radio reset is avoided, when the battery pack is in charging mode with the voltage greater than 8V and when no radio 212 is connected to it, by switching the cell configuration of the battery cells from a series cell configuration to a parallel cell configuration.

Figure 13:
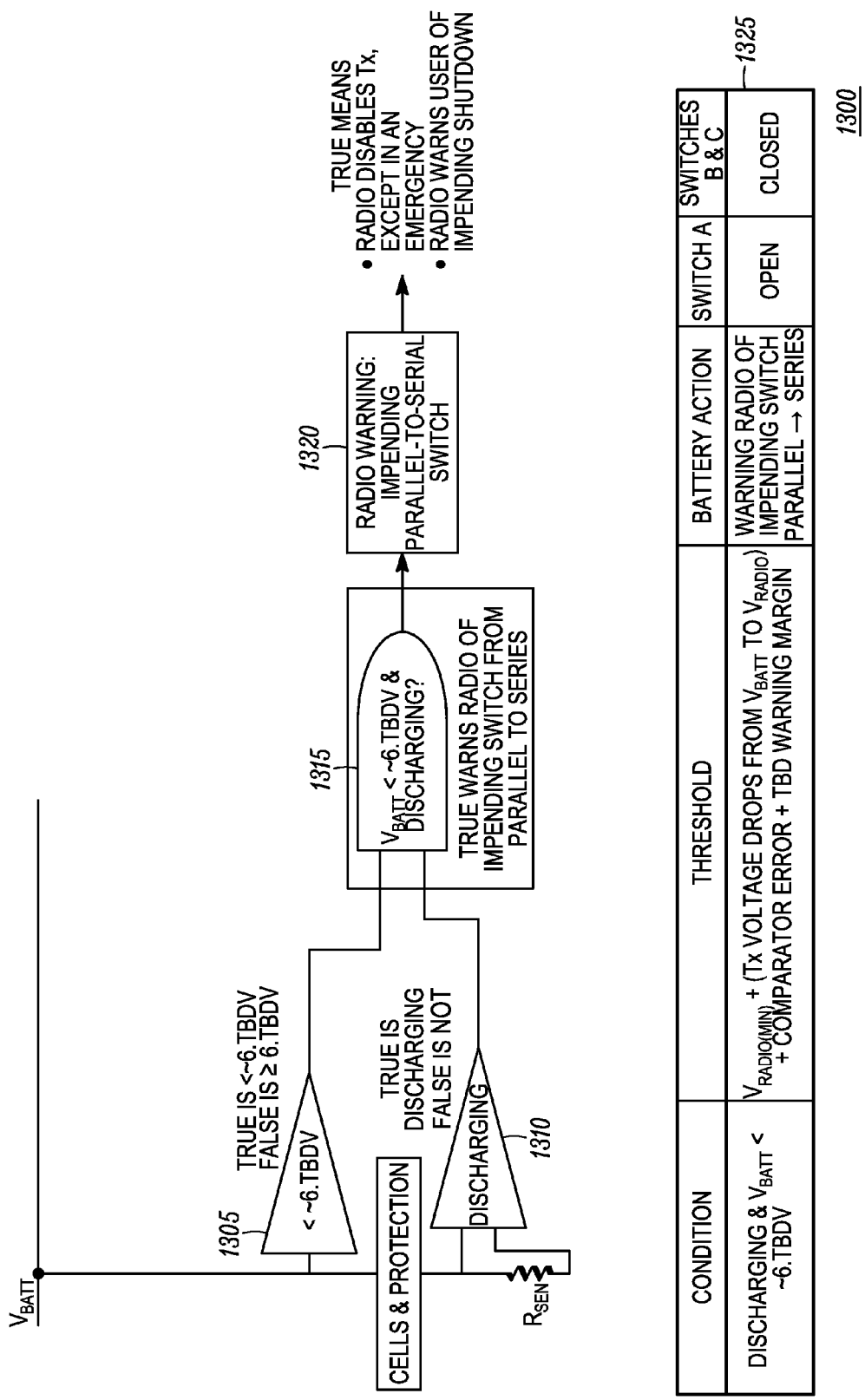
FIG. 13 is a switch control logic diagram for generating a radio warning signal in accordance with the various embodiments.

FIG. 13 shows a control logic 1300 that provides a means for generating a radio 212 warning signal in accordance with the various embodiments of the present disclosure. The control logic 1300 comprises two comparators 1305 and 1310 for providing a means for generating the radio 212 warning signal. The comparator 1305 is set to a predetermined minimum threshold voltage based on the radio 212 minimum operation voltage (e.g., ~6V). Similarly, the comparator 1310 determines whether the radio 212 is in discharging state or not. The outputs of both the comparators 1305 and 1310 are provided to an AND gate 1315 that determines whether the voltage of the battery pack 204 is less than the radio 212 minimum threshold volatge (e.g., ~6V) and the battery is in discharging state or not. The AND gate 1315 generates sends a high logic level signal (for example, logic level 1) to the radio 212 to warn the radio 212 that the battery pack 204 is about to switch from the parallel cell configuration to series cell configuration. During switching operation, the battery cells break the parallel connection before making the series connection thereby providing the radio 212 with no or very less voltage. In order to prevent the radio 212 from transmitting during this switching operation, the warning signal is sent to the radio 212 to stop or delay the transmission. The table 1325 shown in FIG. 13 shows the action taken by the battery pack 204 to warn the radio 212 of the switch when the battery pack 204 is in discharging mode and the voltage is less than the radio 212 minimum operating voltage threshold (e.g., ~6V).

In accordance with another embodiment of the present disclosure, the control logic 1300 shown in FIG. 13 is also used to send the warning signal to the radio 212 when the battery pack 204 is about to switch from a series cell configuration to a parallel cell configuration based upon the various voltage conditions and the modes (charging mode, discharging mode and a quiescent mode) of the battery packs discussed in FIGS. 11 and 12.

Figure 14:
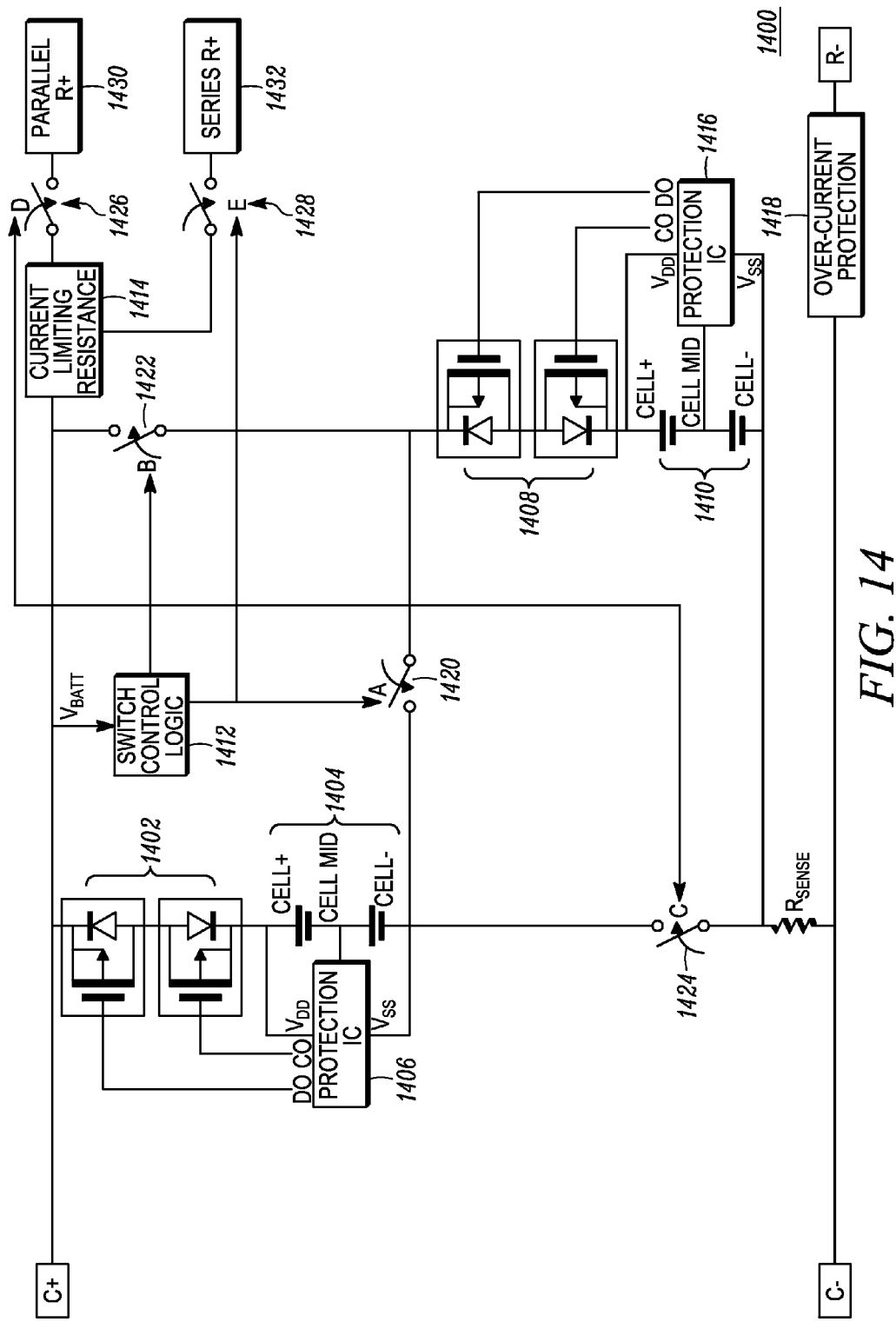
FIG. 14 is a circuit diagram of the battery pack with parallel and series outputs to a radio input in accordance with the various embodiments.

FIG. 14 is a circuit diagram 1400 of the battery pack 204 with a separate parallel and series outputs to the radio 212 in accordance with the various embodiments. In FIG. 14, the battery pack 204 provides series and parallel voltages generated using the series cell configuration and the parallel cell configuration respectively as two different inputs namely parallel and series 1430, 1432 to the radio 212. In accordance with various embodiments of the present disclosure, a switch control logic 1412 is provided in the battery pack 204 to determine the cell configuration (i.e. series cell configuration or parallel cell configuration) in which the battery pack 204 is operating and controlling the switches 1426 and 1428 to provide output (either parallel 1430 or series 1432) to the radio 212. In addition, the control to switch A 1420 also controls switch E 1428, enabling the series output to the radio 212. In addition, the control to switches B 1422 and C 1424 also controls switch D 1426, enabling the parallel output to the radio 212. As an example, when the battery pack 204 is operating in the series cell configuration, the switch control logic 1412 opens the switch 1426 and closes the switch 1428 to provide series output voltage 1432 to the radio 212. Similarly, when the battery pack 204 is operating in the parallel cell configuration, the switch control logic 1412 opens the switch 1428 and closes the switch 1426 to provide parallel output voltage to the radio 212. Providing the series and parallel output voltages as separate inputs to the radio 212 allows the radio 212 to more actively manage its power usage. For example, when the battery pack 204 is operating in the series cell configuration, the series output voltage 1432 provided communicates to the radio 212 the series cell configuration state of the battery pack 204 so that the radio 212 can manage its power while transmitting the data.

Figure 15:
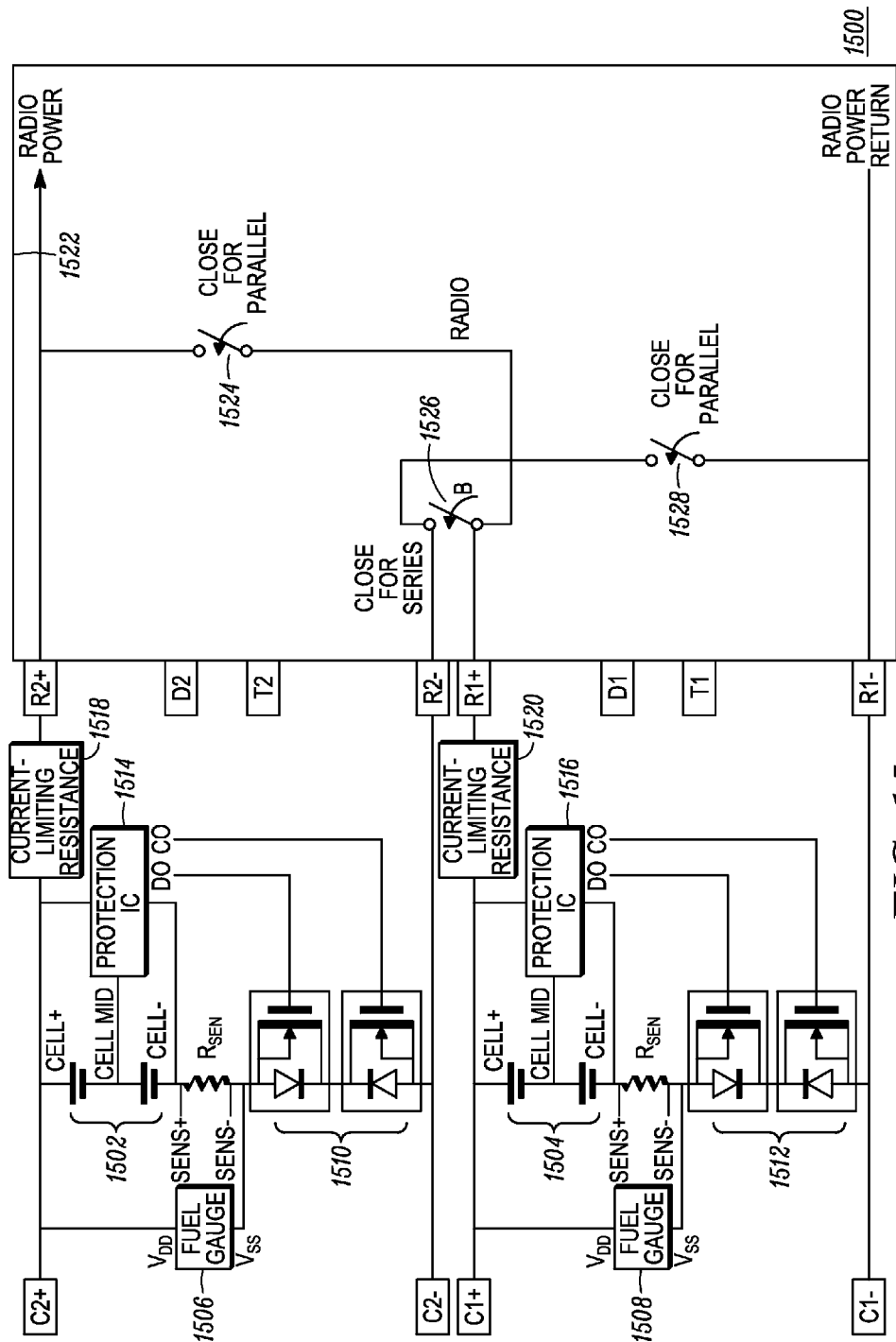
FIG. 15 is a circuit diagram of a battery pack system with a control circuit in the radio in accordance with the various embodiments.

FIG. 15 is a detailed circuit diagram of a battery pack interface system 1500 with a switch control circuitry 1522 provided in the radio 212 in accordance with the various embodiments. In accordance with some embodiments of the present disclosure, the switch control circuitry 1522 shown in FIG. 15 is provided inside the radio 212. As shown in FIG. 15, the voltage generated by the first set of cells 1502 is provided to the R2+ contact via the Current-Limiting Resistance 1518 and the voltage generated by the second set of cells 1504 is provided to the R1+ contact via the Current-Limiting Resistance 1520. The voltages delivered to R1+ and R2+ are then used by the switch control circuitry 1522 provided inside the radio 212 to determine whether there is a need to switch the cell configuration from series to parallel or parallel to series based on the output voltage of the first set of the battery cells 1502 and the second cell of the battery cells 1504 of the battery pack. In accordance with some embodiments of the present disclosure, the switch control circuitry 1522 inside the radio 212 closes the switches 1524 and 1528 and opens the switch 1526 when it determines that the first set of battery cells 1502 and the second set of the battery cells 1504 needs to be switched from serial cell configuration to parallel cell configuration. Similarly, when the switch control circuitry inside the radio 212 determines that the first set of the battery cells 1502 and the second set of the battery cells 1504 needs to be operated in series cell configuration, the switch control circuitry 1522 closes the switch 1526 and opens the switches 1524 and 1528.

Figure 16:
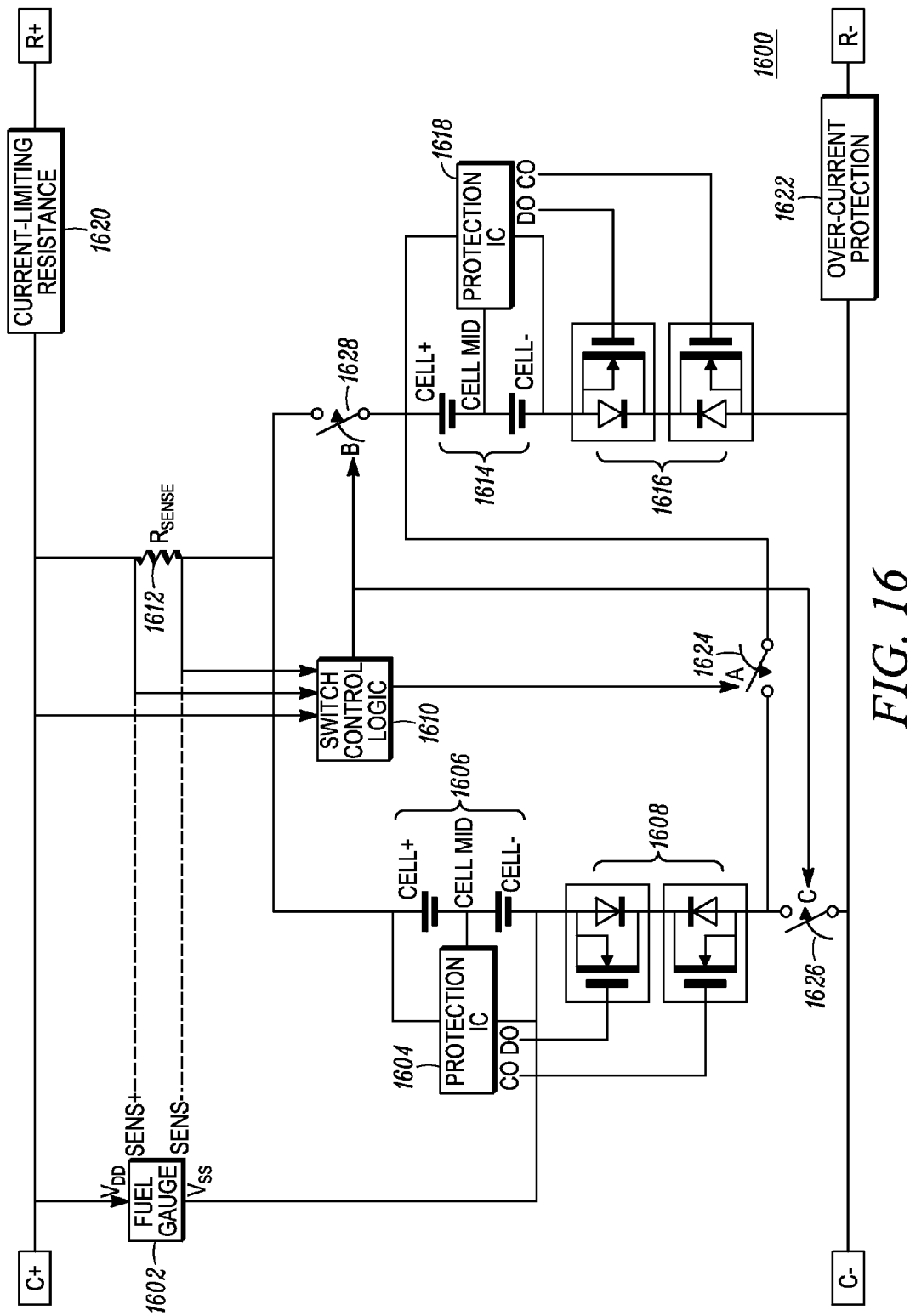
FIG. 16 is a circuit diagram of a battery pack with a low side protection and novel coulomb counting fuel gauge in accordance with the various embodiments.

FIG. 16 shows a circuit diagram of a battery pack 1600 with a low side protection configuration in accordance with the various embodiments. In FIG. 16, the battery pack 1600 comprises a novel coulomb counting fuel gauge. FIG. 16 shows the battery pack with the low side protection where the first set of FETs 1608 and the second set of FETs 1616 are coupled below the first set of battery cells 1606 and the second set of battery cells 1614 respectively. In accordance with some embodiments of the present disclosure, coupling the first set of FETs 1608 and the second set of FETs 1616 below the first set of battery cells 1606 and the second set of battery cells 1614 respectively allows the use of lower cost and small size FETs in the first set of FETs 1608 and the second set of FETs 1616 of the battery pack 1600.

Figure 17:
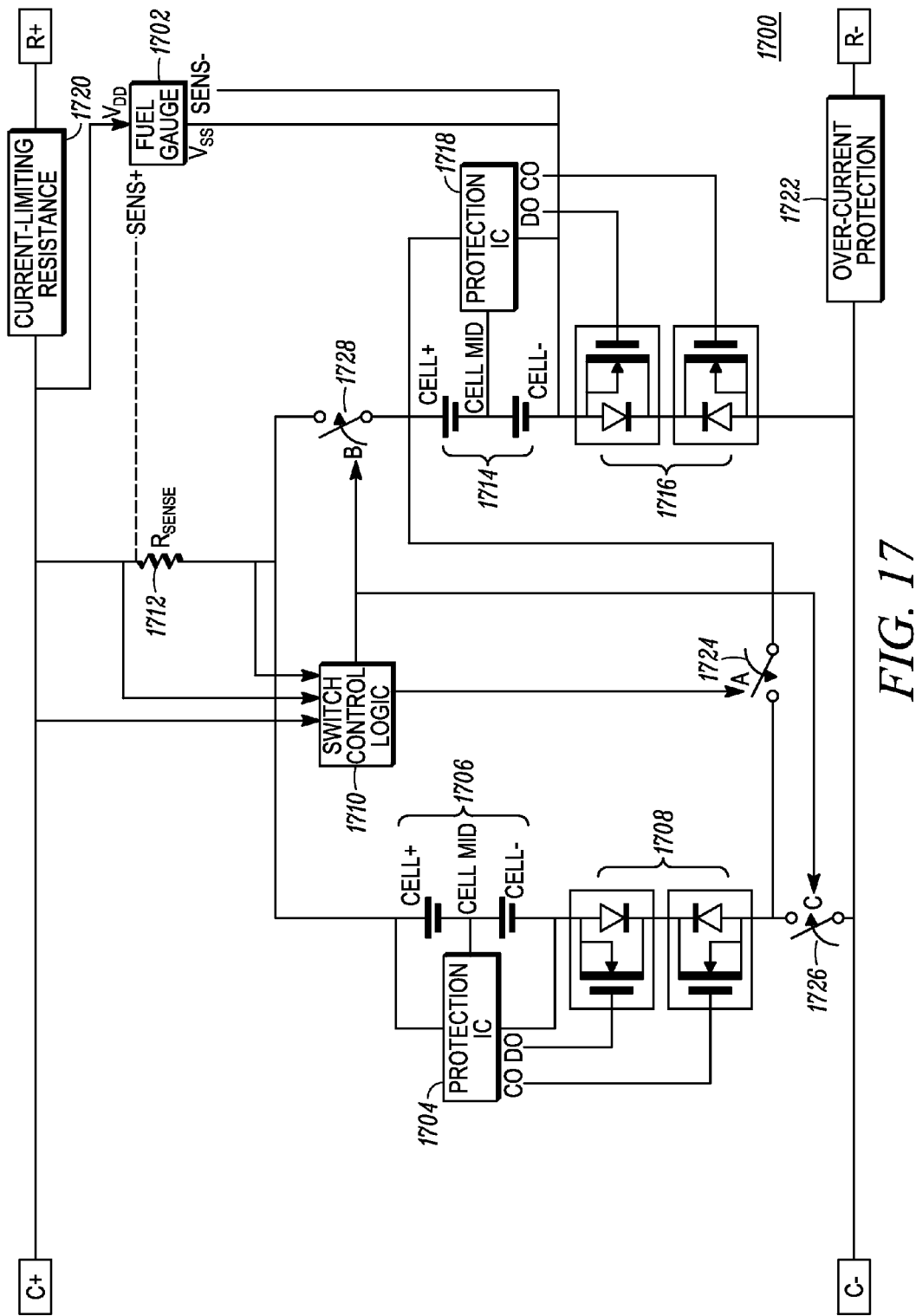
FIG. 17 is a circuit diagram of a battery pack with a low side protection and novel voltage modeling fuel gauge in accordance with the various embodiments.

FIG. 17 shows circuit diagram of a battery pack 1700 with a low side protection configuration in accordance with the various embodiments. In FIG. 17, the battery pack 1700 comprises a novel voltage modeling fuel gauge. FIG. 17 shows the battery pack with the low side protection where the first set of FETs 1708 and the second set of FETs 1716 are coupled below the first set of battery cells 1706 and the second set of battery cells 1714 respectively. In accordance with some embodiments of the present disclosure, coupling the first set of FETs 1708 and the second set of FETs 1716 below the first set of battery cells 1706 and the second set of battery cells 1714 respectively allows the use of lower cost and small size FETs in the first set of FETs 1708 and the second set of FETs 1716 of the battery pack 1700.

The implementation of a switch control logic discussed herein in accordance with embodiments of the present disclosure described herein allows a radio to fully discharge the new lithium ion cells with wider voltage range. The migration of the lithium-ion cell technology from 3.0-4.2V to 2.0-4.2V makes it difficult for the legacy radios and chargers designed for narrower voltage range to fully utilize its capacity because the radio will perform a low-voltage shutdown before fully-discharging the new-technology battery cells. The present disclosure addresses the problem by including switch control logic that switches the cell configuration from series to parallel or parallel to series in accordance with various embodiments. In some systems, it is preferred to keep the operating voltage level above the minimum radio operational voltage (e.g., ~6V) for radio operation. Embodiments of the present disclosure can be implemented in such systems to keep the voltage level above the minimum operating voltage threshold of the applicable host device being powered by the battery. Cells such as lithium based cells have low end voltages that vary from cell to cell. In order to access the capacity available from the cells switch form parallel to series to maintain energy to the radio. Selectively switching the battery cells into series or parallel cell configurations allows the host device to fully discharge the battery cells thereby capitalizing on the full available capacity of those battery cells. Since the switch from parallel to series cell configuration doubles the voltage available to the host devide, load current is effectively halved, while maintaining equivalent power to the host device. With lower current associated with the higher voltage, votlage drops across pathway resistances are minimized enabling the host device to consume electrical power more efficiently. Thus, legacy host devices can now utilize the capacity of newer-technology rechargeable cells by fully discharging the cells, thereby capitalizing on the full capacity of those cells.

The switch control logic in accordance with the various embodiments of the present disclosure further allows a non-complex detection of voltage and charging/discharging status of the battery pack by using simpler comparator type representation, rather than requiring more-complex embedded processors, bus protocols and analog-to-digital converters etc.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains ... a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A battery pack, comprising:
   a plurality of cells for generating an output voltage at the battery pack; and
   a switch control logic coupled to the plurality of cells, the switch control logic for determining:
      the output voltage generated by the plurality of cells; and
      an operating state of the battery pack, wherein the operating state comprises one of a charging state, a discharging state, or a quiescent state;
      wherein the switch control logic is configured to selectively switch the plurality of cells between a series cell configuration and a parallel cell configuration based on a combination of the determined output voltage and the determined operating state of the battery pack.

2. The battery pack of claim 1, wherein the switch control logic comprises:
   a plurality of comparators for determining the output voltage generated by the plurality of cells in the battery pack; and
   a thermistor enable line for determining the operating state of the battery pack.

3. The battery pack of claim 1, wherein the operating state of the battery pack is the charging state when the battery pack is connected to a charger, the discharging state when the battery pack is connected to a charger or a host device and the battery pack is being discharged, or the quiescent state when the battery pack is neither in the charging state nor in the discharging state.

4. The battery pack of claim 1, further comprising a fuel gauge for estimating a level of charge in the plurality of cells of the battery pack by monitoring a voltage across a sense resistor when the plurality of cells are either in the series cell configuration or in the parallel cell configuration.

5. The battery pack of claim 4, wherein the fuel gauge is at least one of a voltage modeling fuel gauge, a coulomb counting fuel gauge, or an impedance modeling fuel gauge.

6. The battery pack of claim 4, wherein the fuel gauge monitors a voltage across the plurality of cells instead of the voltage across the sense resistor during the selective switching of the plurality of cells between the series cell configuration and the parallel cell configuration.

7. A rechargeable battery powered device, comprising:
   a host device;
   a battery pack coupled to the host device, the battery pack having a plurality of rechargeable cells; and
   a switch control logic for determining an output voltage generated by the plurality of rechargeable cells at output terminals of the battery pack and for determining an operating mode of the battery pack, and for selectively switching the plurality of rechargeable cells between a series cell configuration and a parallel cell configuration based on a combination of the determined output voltage and the determined operating mode thereby allowing the host device to fully discharge the plurality of rechargeable cells.

8. The rechargeable battery powered device of claim 7, wherein the switch control logic is included in the host device.

9. The rechargeable battery powered device of claim 7, wherein the switch control logic is included in the battery pack.

10. The rechargeable battery powered device of claim 7, wherein the host device comprises a portable radio.

11. The rechargeable battery powered device of claim 7, wherein the switch control logic is operable to send a warning signal to the host device prior to switching the plurality of rechargeable cells between a series cell configuration and a parallel cell configuration.

12. The rechargeable battery powered device of claim 11, wherein the host device is operable to delay its transmission of data upon receiving the warning signal.

13. A method for configuring a battery pack, comprising:
   at a switch control logic of the battery pack:
      determining an output voltage generated by a plurality of cells at output terminals of the battery pack;
      determining an operating state of the battery pack, wherein the operating state comprises one of a charging state, a discharging state or a quiescent state; and
      selectively switching the plurality of cells between a series cell configuration and a parallel cell configuration based upon a combination of the determined output voltage and the determined operating state of the battery pack.

14. The method of claim 13, wherein the operating state of the battery pack is the charging state when the battery pack is connected to a charger, the discharging state when the battery pack is connected to a charger or a host device and the battery pack is being discharged, or the quiescent state when the battery pack is neither in the charging state nor in the discharging state.

15. The method of claim 13, further comprising estimating, by a fuel gauge, a level of charge in the plurality of cells of the battery pack by monitoring a voltage across a sense resistor when the plurality of cells are either in the series cell configuration or in the parallel cell configuration.

16. The method of claim 15, further comprising monitoring, by the fuel gauge, a voltage across the plurality of cells instead of the voltage across the sense resistor during the selective switching of the plurality of cells between the series cell configuration and the parallel cell configuration.

17. A battery pack interface system comprising:
a battery pack including a plurality of rechargeable cells; and
a switch control logic within the battery pack for:
- determining whether the battery pack is in a charging state or in a discharging state;
- determining an output voltage of the battery pack;
- switching the plurality of rechargeable cells of the battery pack from a series cell configuration to a parallel cell configuration when the battery pack is in the charging state and the output voltage is greater than a maximum threshold voltage;
- switching the plurality of rechargeable cells of the battery pack from a series cell configuration to a parallel cell configuration when the battery pack is in the discharging state and the output voltage is less than an intermediate threshold voltage and greater than a minimum threshold voltage; and
- switching the plurality of rechargeable cells of the battery pack from a parallel cell configuration to a series cell configuration when the battery pack is in the discharging state and the output voltage is less than the minimum threshold voltage.

18. The battery pack interface system of claim 17, wherein the switch control logic switches the plurality of rechargeable cells of the battery pack from a series cell configuration to a parallel cell configuration when the battery pack is in the charging state with no host device attached and the output voltage is greater than the intermediate threshold voltage.

19. The battery pack interface system of claim 17, wherein the maximum threshold voltage is set to a maximum allowable by a charger or a host device, the intermediate threshold voltage is set to the minimum series-configuration voltage when discharging, and the minimum threshold voltage is set to the minimum allowable for operation of the host device.

20. The battery pack interface system of claim 17, wherein the switch control logic comprises a plurality of comparators each having a predetermined threshold voltage set in accordance with one of the maximum threshold voltage, the intermediate threshold voltage, and the minimum threshold voltage.

* * * * *